(12) United States Patent
Hasegawa

(10) Patent No.: US 10,169,022 B2
(45) Date of Patent: Jan. 1, 2019

(54) INFORMATION PROCESSING APPARATUS AND RESOURCE MANAGEMENT METHOD

(71) Applicant: CANON KABUSHIKI KAISHA, Tokyo (JP)

(72) Inventor: Kiwamu Hasegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/395,092

(22) Filed: Dec. 30, 2016

(65) Prior Publication Data

US 2017/0206072 A1 Jul. 20, 2017

(30) Foreign Application Priority Data

Jan. 15, 2016 (JP) .................... 2016-006558

(51) Int. Cl.
| | |
|---|---|
| H04N 7/173 | (2011.01) |
| G06F 9/445 | (2018.01) |
| G06F 9/44 | (2018.01) |
| G06F 8/61 | (2018.01) |
| G06F 3/06 | (2006.01) |
| G06F 8/54 | (2018.01) |
| G06F 8/72 | (2018.01) |

(52) U.S. Cl.
CPC .............. *G06F 8/61* (2013.01); *G06F 3/0647* (2013.01); *G06F 3/0667* (2013.01); *G06F 8/54* (2013.01); *G06F 8/72* (2013.01); *G06F 9/44521* (2013.01); *G06F 9/44578* (2013.01); *G06F 9/44589* (2013.01)

(58) Field of Classification Search
CPC ............. G11B 17/225; G06F 17/30563; G06F 17/271; G06F 17/30675; G06F 9/4411; G06F 8/65; G06F 8/63; G06F 17/505; G06F 8/61; G06F 8/54; G06F 8/72; G06F 3/0647; G06F 3/0667; G06F 9/44521; G06F 9/44578; G06F 9/44589; G06Q 10/10; H04L 5/0007; H04L 5/0046; H04N 21/47202; H04N 21/25858; H04N 21/25833

See application file for complete search history.

(56) References Cited

U.S. PATENT DOCUMENTS 5,548,759 A 8/1996 Lipe
8,387,032 B1 2/2013 Goldman et al.
(Continued)

FOREIGN PATENT DOCUMENTS

JP 2005-293084 A 10/2005

OTHER PUBLICATIONS

European Search Report issued in corresponding European Patent Application No. 16207046.0 dated Jun. 8, 2017.
(Continued)

*Primary Examiner* — Thuy Dao
(74) *Attorney, Agent, or Firm* — Venable LLP

(57) ABSTRACT

According to the present invention, as a part of processing for starting up an apparatus or in the case where an app is installed, it is determined whether there are a plurality of libraries in the settings of a class path, and if it is determined that a plurality of libraries are set, the libraries that are set are expanded and the expanded libraries are integrated as a new library, after which the newly created library is set as a class path.

12 Claims, 19 Drawing Sheets

(56) References Cited

U.S. PATENT DOCUMENTS

| | | | |
|---|---|---|---|
| 8,789,010 B2* | 7/2014 | Lambert | G06F 9/44505 717/104 |
| 9,703,551 B2* | 7/2017 | Thorat | G06F 8/71 |
| 10,051,302 B2* | 8/2018 | Hasek | H04N 7/17309 |
| 2003/0009743 A1* | 1/2003 | Fresko | G06F 9/44563 717/117 |
| 2004/0103404 A1* | 5/2004 | Naumovich | G06F 9/4433 717/136 |
| 2005/0010911 A1 | 1/2005 | Kim et al. | |
| 2005/0060698 A1* | 3/2005 | Boykin | G06F 9/44526 717/166 |
| 2005/0278718 A1* | 12/2005 | Griffith | G06F 9/445 717/175 |
| 2008/0184103 A1* | 7/2008 | Liu | G06F 8/37 715/234 |
| 2008/0301710 A1* | 12/2008 | Shetty | G06F 9/445 719/316 |
| 2010/0138819 A1* | 6/2010 | Burka | G06F 8/4434 717/154 |
| 2010/0281470 A1* | 11/2010 | Bentz | G06F 8/447 717/139 |
| 2011/0296151 A1* | 12/2011 | Martinez | G06F 8/71 713/1 |
| 2016/0232017 A1* | 8/2016 | Raundahl Gregersen | G06F 9/44521 |
| 2017/0010906 A1* | 1/2017 | Fulton | G06F 9/44521 |
| 2017/0286255 A1* | 10/2017 | Kinnear | G06F 8/437 |

OTHER PUBLICATIONS

Travis G: "Minimize Java Distributions with an Automated, Custom JAR File", Internet Citation, Oct. 24, 2003(Oct. 24, 2003), XP002363935, Retrieved from the Internet:URL:http://www.devx.com/Java/Article/17674 on Jan. 23, 2006.

European Office Action issued in corresponding European Application No. 16207046.0 dated Oct. 5, 2018.

\* cited by examiner

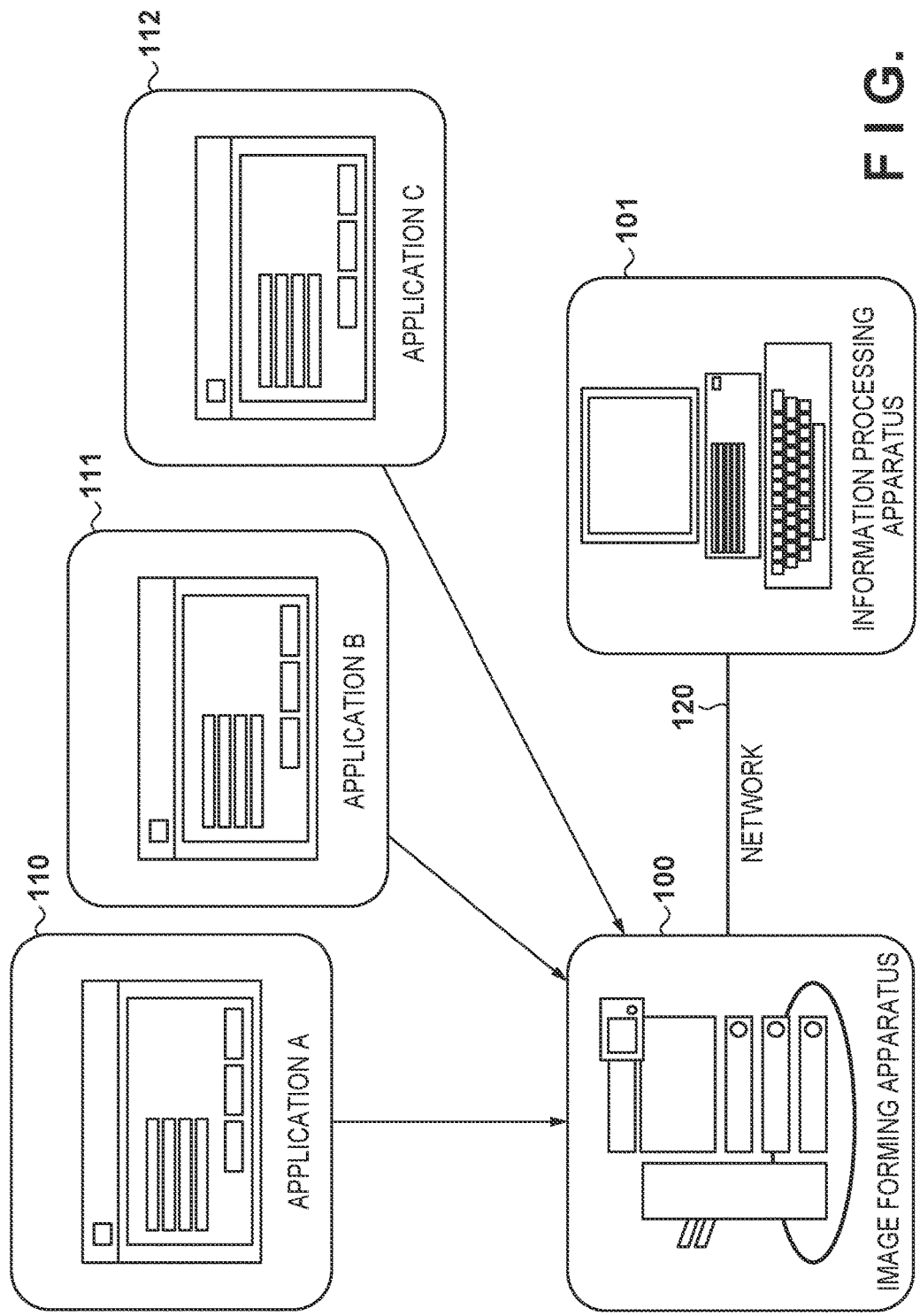

EXEMPLARY STARTUP OPTION CONFIGURATION FILE

401 -Dsun.boot.library.path=/Device/lib
402 -Xbootclasspath/a
403 :/Device/system/lib/libSystem001.jar
　　:/Device/system/lib/libsystem002.jar
　　:/Device/system/lib/libsystem003.jar
　　⋮
404 /service/boot/MainBooter

EXEMPLARY STARTUP OPTION CONFIGURATION FILE

-Dsun.boot.library.path=/Device/lib
411 -Xbootclasspath/a:/Device/system/lib/libinteg.jar
/service/boot/MainBooter

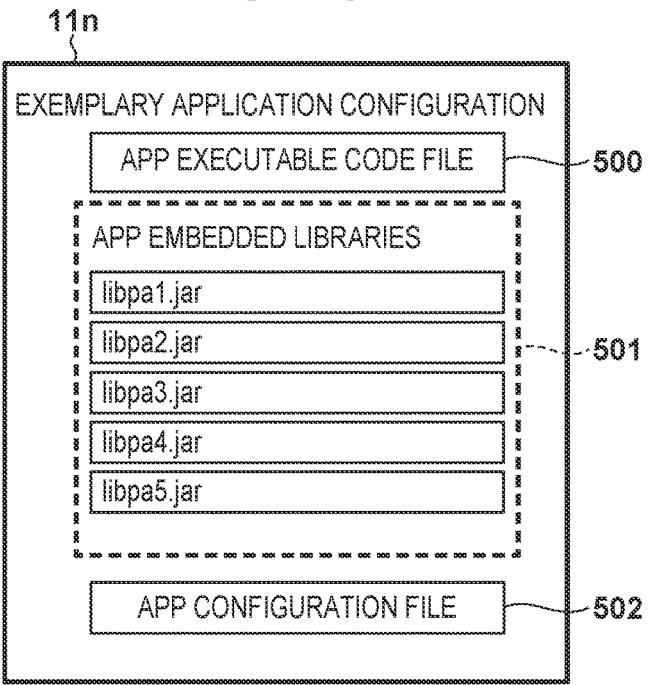

EXEMPLARY STARTUP OPTION CONFIGURATION FILE

-Dsun.boot.library.path=/Device/lib

1001 -Xbootclasspath/a
:/Device/system/lib/libSystem001.jar
:/Device/system/lib/libsystem002.jar
⋮

1002 -Djava.class.path=/Device/system/lib/libSystem003.jar
:/Device/system/lib/libSystem004.jar
⋮
/service/boot/MainBooter

EXEMPLARY STARTUP OPTION CONFIGURATION FILE

-Dsun.boot.library.path=/Device/lib

1011 -Xbootclasspath/a:/Device/system/lib/libbootinteg.jar
1012 -Djava.class.path=/Device/system/lib/libinteg.jar
/service/boot/MainBooter

F I G. 11

1100

"EXEMPLARY APP CONFIGURATION FILE"

ApplicationName : PreviewApp
ApplicationID : A880-C10F-0002-0142
ApplicationResource :
  MAX_Storage : 563877
  MAX_Memory : 546112
  MAX_Thread : 3
  MAX_FileDescriptor : 8
  MAX_Socket : 1

1101 — ApplicationClassPath

```
:
:libpreviewapp_integ.jar
```
— 1102

INFORMATION PROCESSING APPARATUS AND RESOURCE MANAGEMENT METHOD

BACKGROUND OF THE INVENTION

Field of the Invention

The present invention relates to an information processing apparatus and a resource management method that manage libraries that are set in class paths.

Description of the Related Art

In a Java (registered trademark) execution environment, classes (codes required in execution) are loaded by a class loader. Classes are defined by class files in JAR (Java Archive) format that are within libraries. Libraries are constituted by the class files of a plurality of classes, and are often divided by specific function. Note that a path indicating the locations of the libraries needs to be set in advance in the Java (registered trademark) execution environment as a class path. This is for the class loader, at the time of loading a class, to search the libraries that are set in the class path for the class to be loaded. Here, the class loader uses file descriptors, in order to refer to libraries and search for classes, thus the used file descriptors are consumed as resources. In a Java (registered trademark) execution environment, in order to improve performance or in order to prevent operational instability due to reference to a library being dropped, a library referred to once is referred to until the program that operates in the execution environment ends. Thus, the file descriptor consumed in order for the class loader to refer to the library will be continuously consumed until the program ends.

With an embedded device, resources available to an information processing apparatus serving as the application execution environment are restricted. A file descriptor is also a type of resource, and the number of available file descriptors is restricted. For that reason, the following is carried out. First, the developer defines an upper limit regarding the amount of resources that an application uses. Then, when a user administrator starts the application, an application management framework checks, based on the upper limit, that the amount of resources available to the information processing apparatus is not exceeded.

In terms of conventional technologies, there is a technology for detecting classes that have not been used at all and deleting libraries having classes that have not been used from the class path (e.g., Japanese Patent Laid-Open No. 2005-293084 (Patent Document 1)).

Japanese Patent Laid-Open No. 2005-293084 leaves libraries having classes that are used from the class path. In other words, when there is a large number of libraries having classes that are used from the class path, a large number of file descriptors will be consumed. Thus, when the number of available file descriptors is exceeded, startup processing is affected as a result. In particular, when the number of libraries continually increases due to software updates or function expansion, the number of consumed file descriptors will increase.

SUMMARY OF THE INVENTION

In view of the above, the present invention suppresses consumption of file descriptors, even when the number of libraries that are used increases.

The present invention in its first aspect provides an information processing apparatus that consumes resources of an amount that depends on how many libraries are open, comprising: a determining unit, configured to determine whether the number of libraries including classes set for an installed program is two or more; and an integrating unit, configured to integrate, in a case where it is determined that the number of libraries is two or more, the classes included to the libraries into libraries of smaller number than the number of libraries.

According to the present invention, an increase in file descriptors following an increase in libraries can be suppressed.

Further features of the present invention will become apparent from the following description of exemplary embodiments with reference to the attached drawings.

BRIEF DESCRIPTION OF THE DRAWINGS

FIG. 1 is a configuration diagram of an image forming apparatus.

FIGS. 4A and 4B are configuration diagrams of startup option configuration files in the first embodiment.

FIGS. 5A, 5B and 5C are configuration diagrams of application configuration files in the first embodiment.

FIGS. 10A and 10B are configuration diagrams of startup option configuration files in the second embodiment.

FIG. 11 is a configuration diagram of an application configuration file in the second embodiment.

FIGS. 13A-1, 13A-2 and 13B are flowcharts showing the flow of processing by the image forming apparatus in the second embodiment.

DESCRIPTION OF THE EMBODIMENTS

Hereinafter, embodiments for carrying out the invention will be described using the drawings.

First Embodiment

Figures 1, 13A:
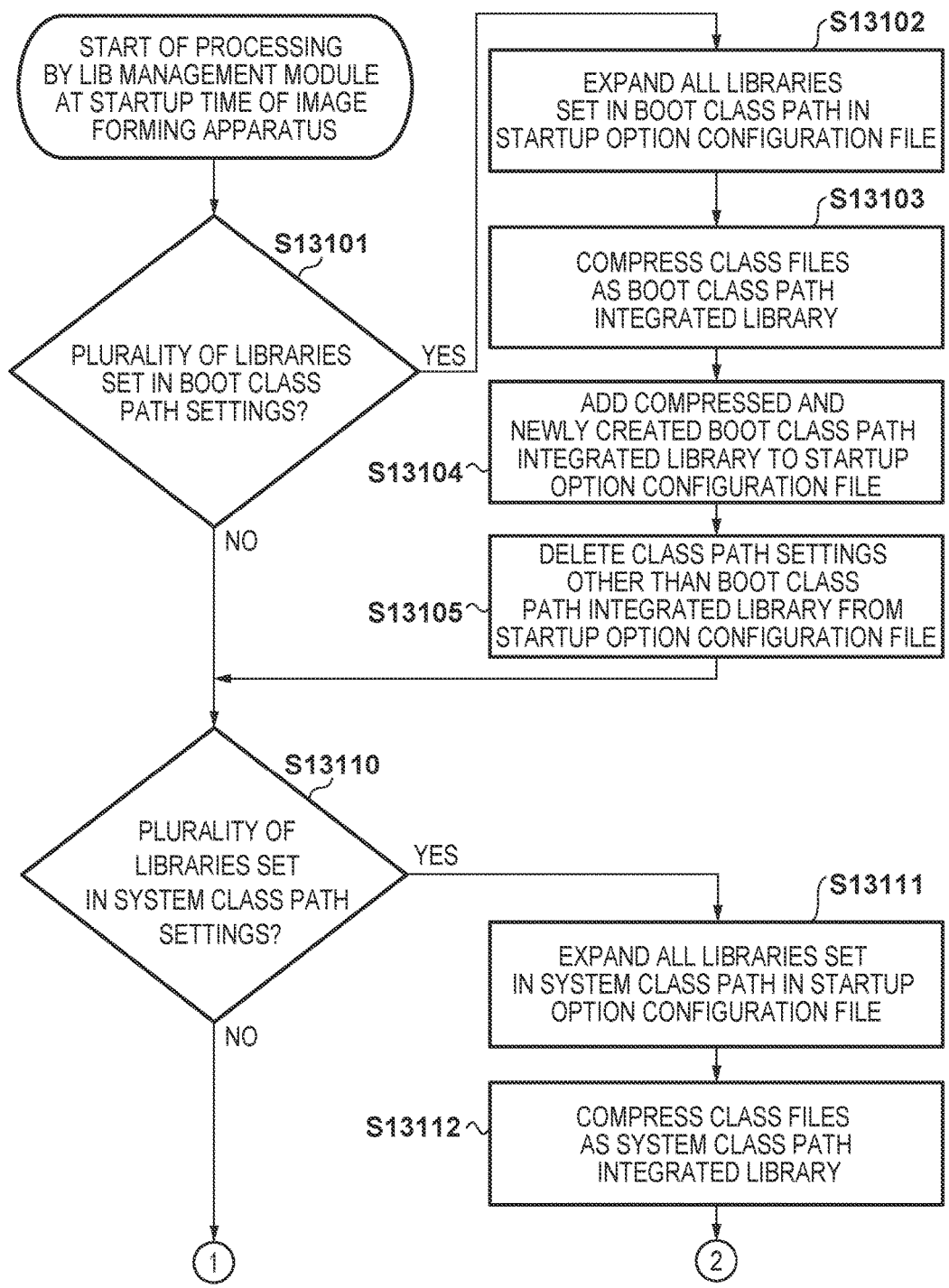
Figures 2, 13A:
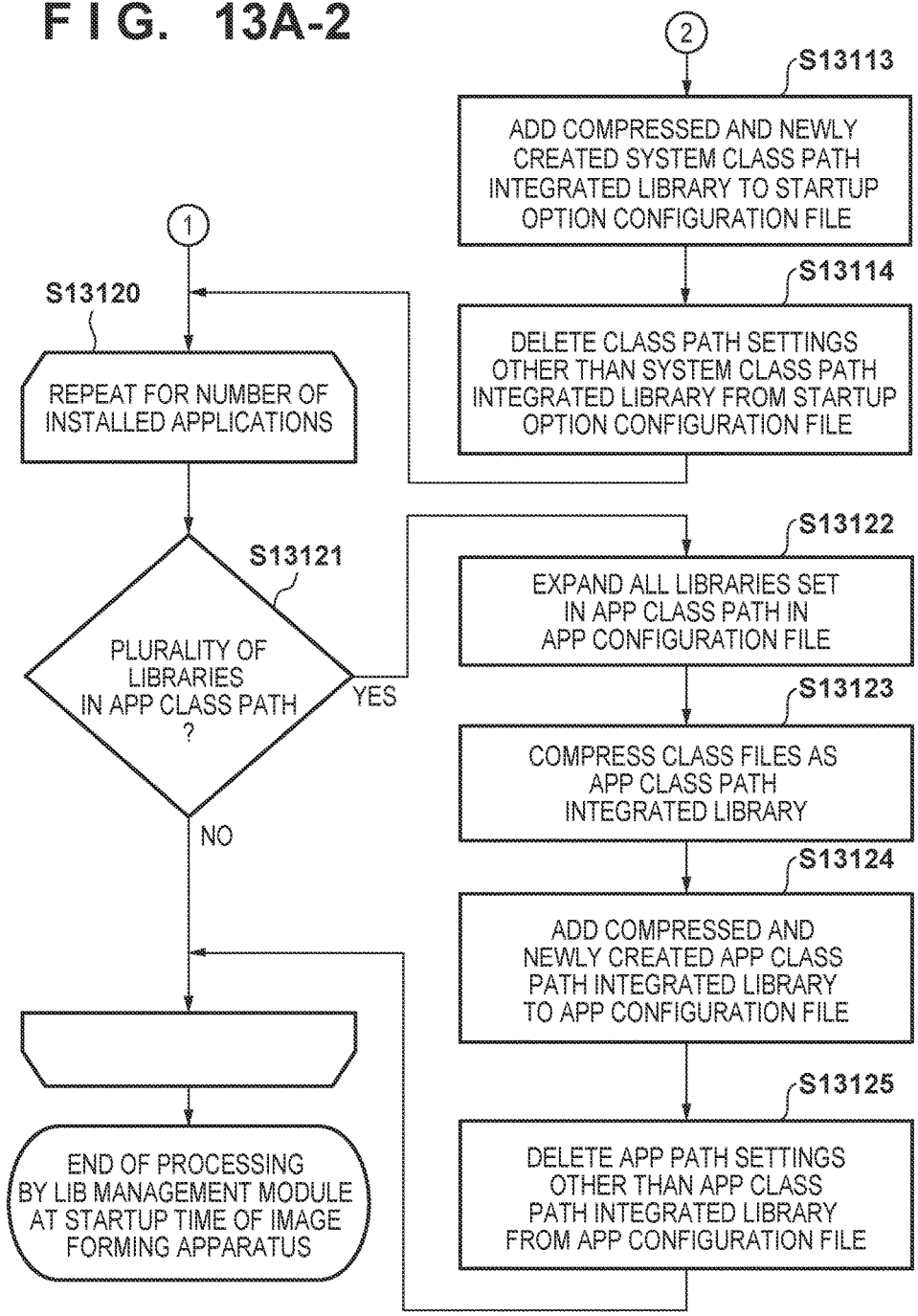

Given in FIG. 1 is a diagram showing a configuration of the overall system of a first embodiment of the present invention. An image forming apparatus 100 is an example of an information processing apparatus in which the present embodiment is implemented, and is, for example, a multifunction peripheral (MFP). An information processing apparatus 101 manages the image forming apparatus 100. A network 120 connects the image forming apparatus 100 and the information processing apparatus 101. The information processing apparatus 101 is used in order to utilize the image forming apparatus 100 via the network 120. An application A 110 is one example of an application that operates on the image forming apparatus 100. An application B 111 is another example of an application that similarly operates on the image forming apparatus 100. Furthermore, an application C 112 is a further example of an application that similarly operates on the image forming apparatus 100. On the image forming apparatus 100, it is possible to operate one or a plurality of applications. Here, three applications are illustrated. Henceforth, the expression "application 11n" indicates one or a plurality of applications that are represented by the application A 110, the application B 111 and the application C 112. It is possible for a general user or an administrator to utilize the basic functions of the image forming apparatus 100, the application 11n and a resource management apparatus for managing the image forming apparatus 100 and the application 11n. In this utilization, it is possible to operate the image forming apparatus 100 directly or from the information processing apparatus 101 via the network 120.

Hardware Configuration of Image Forming Apparatus

Figure 2:
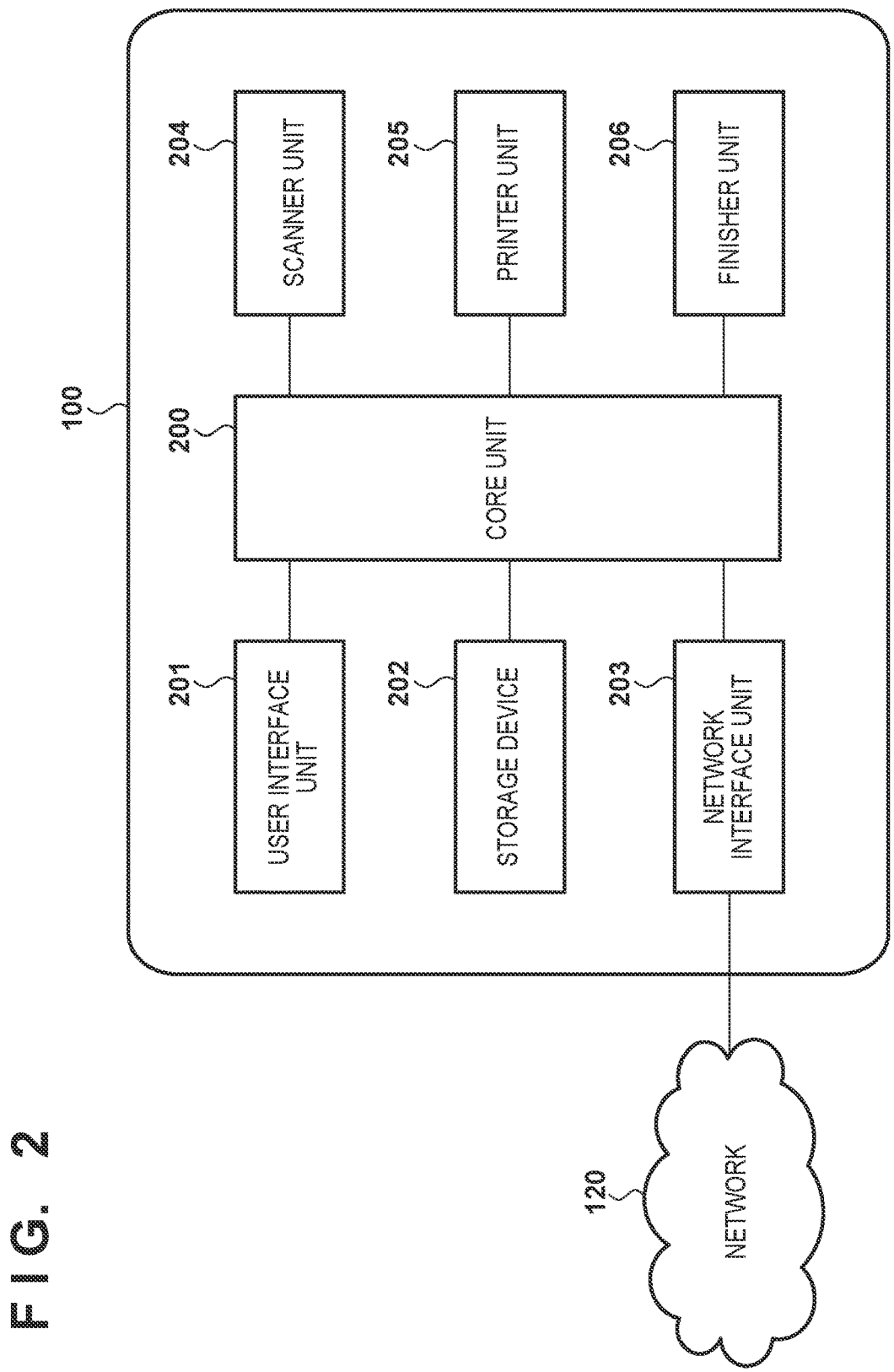
FIG. 2 is a hardware configuration diagram of the image forming apparatus.

FIG. 2 is a diagram schematizing the hardware configuration of the image forming apparatus 100. A core unit 200 is a control unit including a processor, a memory and the like, and controls various devices connected to the core unit 200 as a result of the processor and the memory working together to execute programs. Also, an application execution environment is realized and installed applications are executed. A user interface unit 201, a storage device 202, a network interface unit 203 for connecting to the network 120, a scanner unit 204, a printer unit 205, a finisher unit 206 and the like are connected to the core unit 200 as peripheral devices. The core unit 200 controls these devices, and provides functions thereof to users via the user interface 201 or the network 120 as well as to applications.

Application Execution Environment

Figure 3:
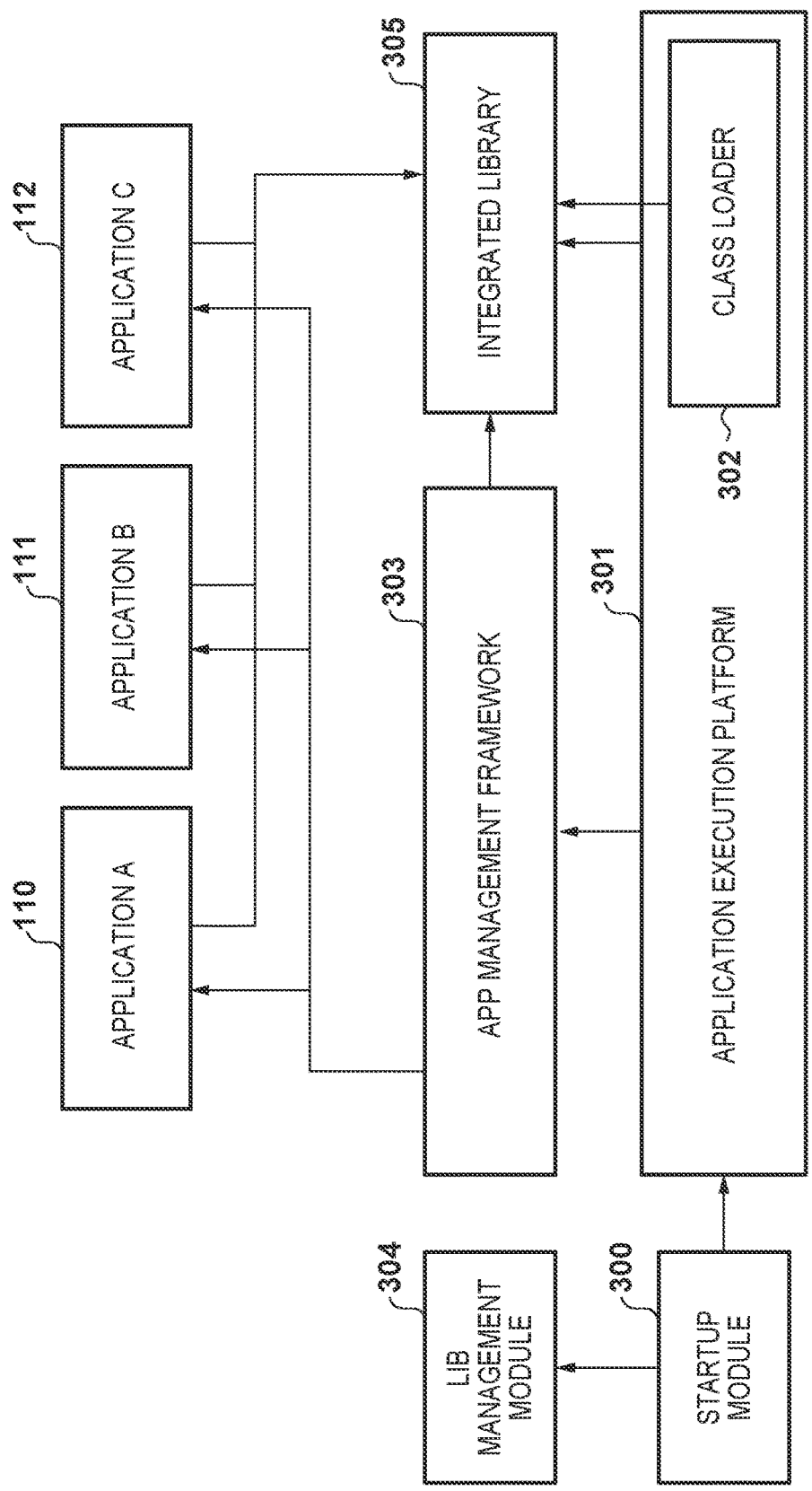
FIG. 3 is a configuration diagram of an application execution environment in the image forming apparatus of a first embodiment.

FIG. 3 is an application execution environment for executing the application 11n on the image forming apparatus 100 of the present embodiment.

A startup module 300 is a module for launching the application execution environment. When a user turns on the image forming apparatus 100, the system starts operating and the startup module 300 commands a Lib management module 304 to perform processing for creating an integrated library which is processing for the present embodiment. The Lib management module 304 is a module for implementing the present embodiment, and recreates libraries that are set in a class path as one integrated library. After the processing for creating an integrated library has ended, the startup module 300 starts up an application execution platform 301. The application execution platform 301 is a Java (registered trademark) execution environment, and is, for example, is a Java (registered trademark) VM (virtual machine). A class loader 302 is a module for loading classes. When an application or a system program is executed and a class is used therein, that class is dynamically loaded by the class loader 302 from a library including that class which is specified by a class path.

In the case where processing for executing a class before being loaded is commanded, the class loader 302 searches the libraries that are set in the class path for the class whose execution is commanded. A class is an executable code for the application execution platform 301 to execute a command, and a class path is path information indicating the location of the library that includes the class. Class paths include a first class path in which the classes required by the system are included, and a second class path in which classes for each application 11n are included. The system is narrowly defined as an operating system, but may, in this example, also indicate a software module other than an application, including an operating system. The first class path is a path required in order to load classes of the system, and includes both a boot class path and a system class path or at least one thereof. The boot class path is a path indicating the locations of libraries that include classes required in order to start up the Java (registered trademark) execution environment. The system class path is a path indicating the locations of libraries that include classes required in order to start up the application execution platform 301 and an app management framework 303. Here, "app" is an abbreviation for "application". The second class path is an app class path (or application class path) indicating the locations of libraries that include the classes of applications. The first class path is passed to the application execution platform 301 as a startup option, when the startup module 300 starts up the application execution platform 301. The application execution platform 301 registers the first class path passed thereto. The second class path is a class path (application class path 514 shown in FIG. 5B) that the app management framework 303 reads from an app configuration file (e.g., app configuration file 502 shown in FIG. 5A) that is included within the application, and the app management framework 303 sets the read class path in the second class path for only the application that is starting. Thus, even though they are called second class paths, the second class paths for respectively different applications 11n are all completely different class paths. In this example, an app configuration file is a Java (registered trademark) manifest file.

In the case where the class loader 302 searches a library set in the class path for a class and the class targeted in the search is found in the library, the class loader 302 loads the class from the library. The application execution platform 301 then executes the loaded class. In the case where the targeted class is not found, the user is warned that the class was not found, through a user interface unit 201 such as a console screen or the screen of a browser. When a class that has not been loaded is executed from when the system of the image forming apparatus 100 starts operating until when the image forming apparatus 100 is turned off by the user, such class load processing by the class loader 302 is performed. Also, name spaces are given in advance to the classes by the developer so that classes having the same name do not conflict. A library is a file obtained by compressing one or more classes as a JAR (Java Archive) file. In order to prevent classes from conflicting in a library, generally a directory hierarchy corresponding to the name spaces is configured in the JAR file, and the files of the classes are arranged therein. The present embodiment will also be described using an example in which the libraries are internally configured by a directory hierarchy of name spaces.

The app management framework 303 is a framework that manages installation, uninstallation, execution and termination of applications 11n, and is, for example, an OSGi. The app management framework 303 is utilized to install and execute applications 11n within the application execution environment. As a result of the administrator making a request to install and start an application 11n to the app management framework 303, the app management framework 303 performs app installation processing and app start processing. At this time, the app management framework 303 refers to the app configuration file (e.g., app configuration file 502 shown in FIG. 5A) of that application, and determines whether the resource upper limit (e.g., resource upper limit 513 in FIG. 5B) declared therein fits into the free space for resources within the current application execution environment. The app management framework 303 then aborts the start of the application if there is insufficient free space.

The following is a description of special constituent elements for carrying out the present embodiment.

The Lib management module 304 is a module for creating an integrated library 305. The Lib management module 304 is commanded to perform integrated library creation processing by the startup module 300. The Lib management module 304 extracts all of the libraries that are set in the first class path (e.g., class path 402 in FIG. 4A) of the startup option configuration file (e.g., startup option configuration file 400 in FIG. 4A), and all of the libraries that are set in the second class path (e.g., class path 514 in FIG. 5B) of the app configuration file (e.g., app configuration file 502 in FIG. 5A). The Lib management module 304 then recompresses the extracted and expanded classes in JAR file format as a new integrated library 305. The Lib management module 304, after creating the integrated library, changes the settings of the first class path (e.g., class path 402 in FIG. 4A) in the startup option configuration file (e.g., startup option configuration file 400 in FIG. 4A) so as to leave only the newly created integrated library 305. Also, the Lib management module 304 deletes the descriptions of the libraries set in the second class path (e.g., class path 514 in FIG. 5B) of the app configuration file (e.g., app configuration file 502 in FIG. 5A). The integrated library 305 that collects the groups of classes within the plurality of libraries that are set as the first class path or the second class path is the only library set in the first class path, and the class loader 302 is able to search for required classes simply by looking at the integrated library. The integrated library 305 is a library that is created by the Lib management module 304. The integrated library 305 is, as aforementioned, a library obtained by compressing the groups of classes of the plurality of libraries that are set in the first class path or the second class path in JAR file format. The classes that are included to the integrated library 305 can be executed by the application execution platform 301, the app management framework 303 and the applications 11*n* once the classes have been loaded by the class loader.

Example of Startup Option Configuration File

FIGS. 4A and 4B are diagrams explaining the contents of typical files describing startup option settings in the present embodiment.

FIG. 4A is a diagram showing the startup option configuration file 400 that has not been changed by the Lib management module 304 in the present embodiment. The startup option configuration file 400 is the startup option configuration file before the Lib management module 304 has created an integrated library and changed the file contents. A path 401 is location information indicating the location of the executable file for starting up the application execution platform 301. A path 402 is location information indicating the location of libraries, and corresponds to the first class path. Libraries 403 are pieces of location information on the libraries that are set as the first class path. The libraries 403 set in the first class path 402 include groups of classes that are required by the application execution platform 301, the app management framework 303 and the like to execute processing. A main program 404 is the location information of a main program that is required by the application execution platform 301 in order to start up the app management framework 303.

FIG. 4B is a diagram showing a startup option configuration file 410 that has been changed by the Lib management module in the present embodiment. The startup option configuration file 410 is a startup option configuration file after the Lib management module 304 has created an integrated library and changed the file contents. The startup option configuration file 410 is obtained by changing the startup option configuration file 400, for example. The startup module 300 reads the contents of the startup option configuration file 410, and uses the read contents as a startup option of the application execution platform 301. An integrated library 411 is the location information of the integrated library 305 that is set as the first class path. After creating the integrated library, the Lib management module 304 adds the paths of the integrated library to the class path settings of the startup option configuration file 400, and deletes the paths of libraries other than the integrated library from the first class path 402.

Example of Application File

FIG. 5A is a diagram explaining the contents of typical files constituting an application 11*n* in the present embodiment. The application 11*n* holds a number of types of files. An app executable code file 500 is a file including information such as the executable code of the application. An app embedded library 501 is a library required to execute the processing of the application. In the case where, in the execution of processing of the application 11*n*, a function cannot be realized due to there being insufficient specific classes in the libraries 403 set in the first class path 402, the developer prepares a library for the application as an app embedded library 501. The app configuration file 502 is a file in which the application ID and other basic information, the upper limit of resources that the application will use, and a second class path are described. The app configuration file 502 is described in advance by the developer, and is included in the application 11*n* together with the app executable code file 500 and the app embedded library 501.

FIG. 5B is a diagram showing an example of items described in the app configuration file 502, before the descriptions of the libraries set in the second class path 514 are deleted by the Lib management module 304. An application name 511 is the name of the application 11*n*. The application name 511 is displayed on the user interface unit 201 of the image forming apparatus 100 or the like. An application ID 512 is identification information that is provided in order for the app management framework 303 to uniquely identify each application 11*n*. The resource upper limit 513 is the upper limit of the resource that the application 11*n* uses. The resource upper limit 513 is defined for every resource. The developer measures the upper limits of resources that the application 11*n* may use in advance, and declares the measured upper limits in the app configuration file 502 as the resource upper limit 513. The app management framework 303 refers to this resource upper limit 513 when installing and starting an application 11*n*. The app management framework 303 then determines whether the resource upper limit 513 fits into the free space for resources within the current application execution environment. The app management framework 303 start the app if there is sufficient free space and aborts the start of the application 11*n* if there is insufficient free space. The second class path 514 is information indicating the location of the app executable code file 500 or the app embedded library 501 required when executing the processing of the application 11*n*. A path 515 is information on the location of the app executable code file 500 or the app embedded library 501 that is set in the second class path. In FIG. 5B, for simplification, the path of the app executable code file 500 is set with a relative path, but may be described with an absolute path. Also, generally, the app embedded library 501 is a library that is not set in the first class path 402, and thus a location needs to be shown in the second class path 514.

FIG. 5C is a diagram showing an example of items that are described in the app configuration file 502 after the descriptions of the libraries set in the second class path 514 have been deleted by the Lib management module 304. When the startup module 300 commands the Lib management module 304 to execute processing for creating the integrated library 305, the Lib management module 304 refers to the second class path 514 of the app configuration file 502. The Lib management module 304 then extracts the app embedded library 501 that is set therein, and recompresses the classes within the libraries set in the first class path 402 and the classes within the app embedded library 501 in JAR file format as the integrated library 305. Thereafter, the Lib management module 304 changes the first class path 402 to only the integrated library 305. A first class path 411 is obtained due to the change. The Lib management module 304 then deletes the descriptions of the libraries set in the second class path 514 of the app configuration file 502. An app configuration file 520 is an app configuration file after the descriptions of the libraries set in the second class path 514 have been deleted. The path of the app executable code file 500 is the only path that is set in the second class path 521 from which the descriptions of the libraries have been deleted. A path 522 is location information on the app executable code file 500 that is set in the second class path. Since the libraries that are set with the path 515 are set in the first class path 411 of the startup option configuration file by the Lib management module 304 as the integrated library 305, the Lib management module 304 deletes the settings of the libraries from the app configuration file. Note that, in the present embodiment, startup option configuration files and app configuration files may be collectively called configuration files.

Example of Library Arrangement

Figure 6:
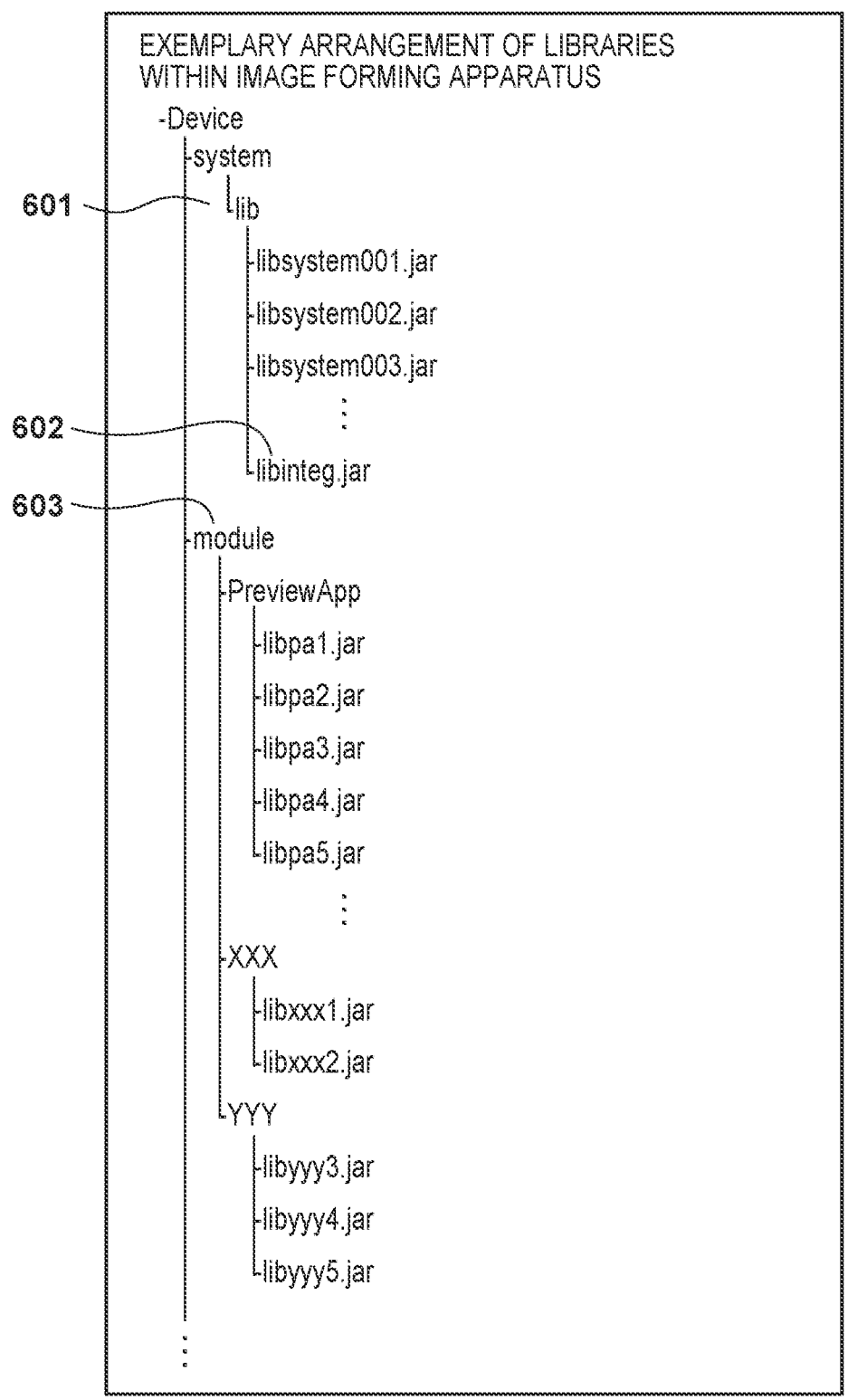
FIG. 6 is a diagram showing a library arrangement within an image forming apparatus 100.

FIG. 6 is a configuration diagram in which an example of the arrangement of libraries within the image forming apparatus 100 is shown in tree form. A folder 601 is a folder for arranging the libraries that are set in the first class path 402. In FIG. 6, the libraries 601 remain inside the image forming apparatus 100, that is, in the "system" folder under "Device", and the same folder configuration as shown with the first class path described in the startup option configuration file 400 is kept and maintained. However, in order to reduce the resources used for storage, the Lib management module 304 may, after deleting the libraries 403 from the settings of the first class path 402, delete the libraries 601. The integrated library 602 is a library created by the Lib management module 304. The Lib management module 304, after creating the integrated library 602, sets the path of this library 602 in the first class path 411. A folder 603 is a folder for arranging the applications 11n installed in the image forming apparatus 100. The app management framework 303, when installing an application 11n, removes the app embedded library 501 from the application 11n, and arranges the app embedded library 501 in the application storage folder 603. In the present embodiment, for simplification, in FIG. 6, an example in which the libraries are collected and arranged by application is given, but as long in the first class paths 402 and 411, which are startup options, and the second class path 514 are consistent, the libraries may be arranged in arbitrary locations. In FIG. 6, libpa1.jar and the like, which are app embedded libraries 501 of an application called PreviewApp, for example, are arranged under a folder called PreviewApp.

Example of Arrangement of Class Files

Figure 7A:
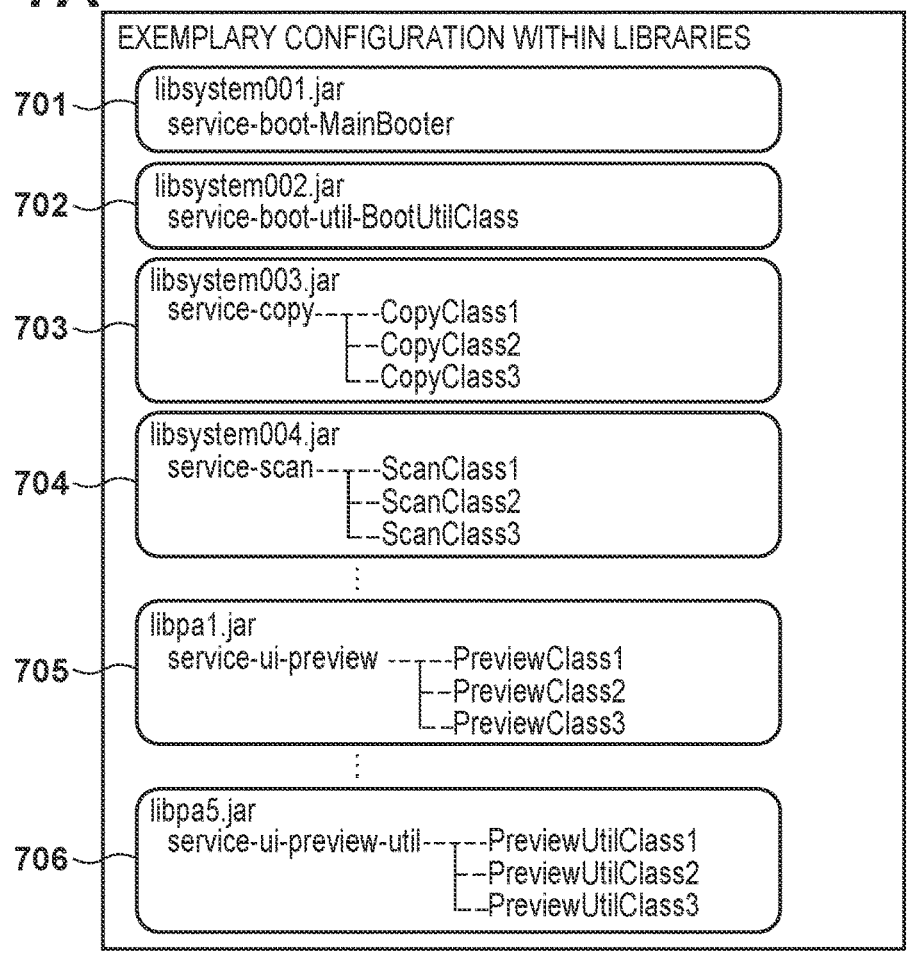
FIGS. 7A and 7B are diagrams showing the arrangement of class files within libraries in the first embodiment.
Figure 7B:
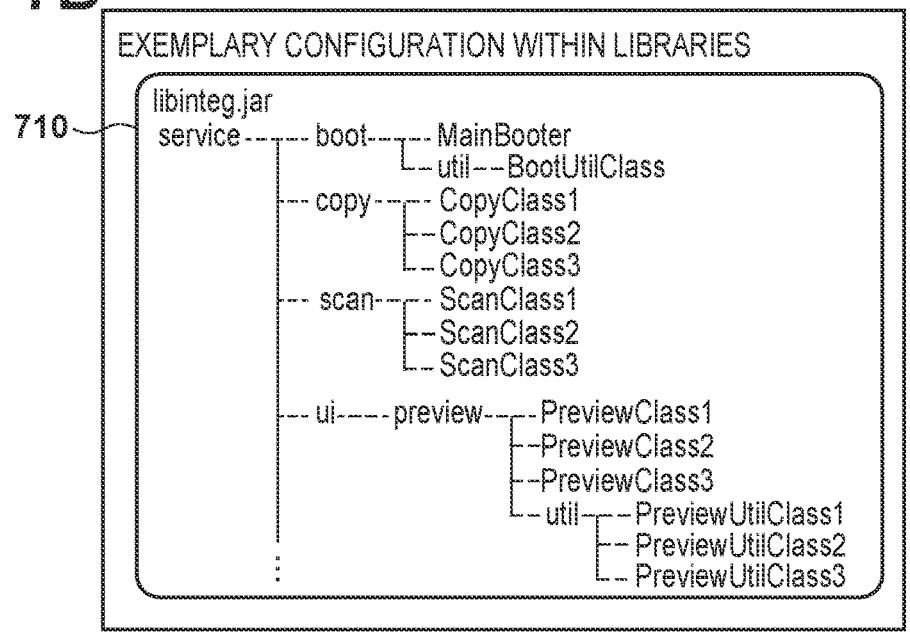

FIGS. 7A and 7B are configuration diagrams showing an example of the arrangement of class files within libraries of the present embodiment in tree form. FIG. 7A is a diagram showing the inside of libraries that the Lib management module 304 extracts in order to collect and compress class files. Libraries 701 to 704 are libraries that are set in the first class path 402, and the class files included therein and the arrangement thereof are shown. Libraries 705 and 706 are libraries that are set in the second class path 514, and show the class files included therein and the arrangement thereof.

FIG. 7B is a diagram showing the internal configuration of the integrated library 305 created by compressing all of the class files, after the Lib management module 304 extracts the libraries. A library 710 is an integrated library that is set in the first class path 411, and shows the class files included therein and the arrangement thereof. Since the class files indicated in FIG. 7A are all arranged within the integrated library, the class loader 302 is able to find classes required in execution of processing simply by searching this integrated library for the required classes. Also, in the example of FIGS. 7A and 7B, the relative paths within the libraries do not change before and after integration.

Application-Related Processing by the Image Forming Apparatus

Figure 8A:
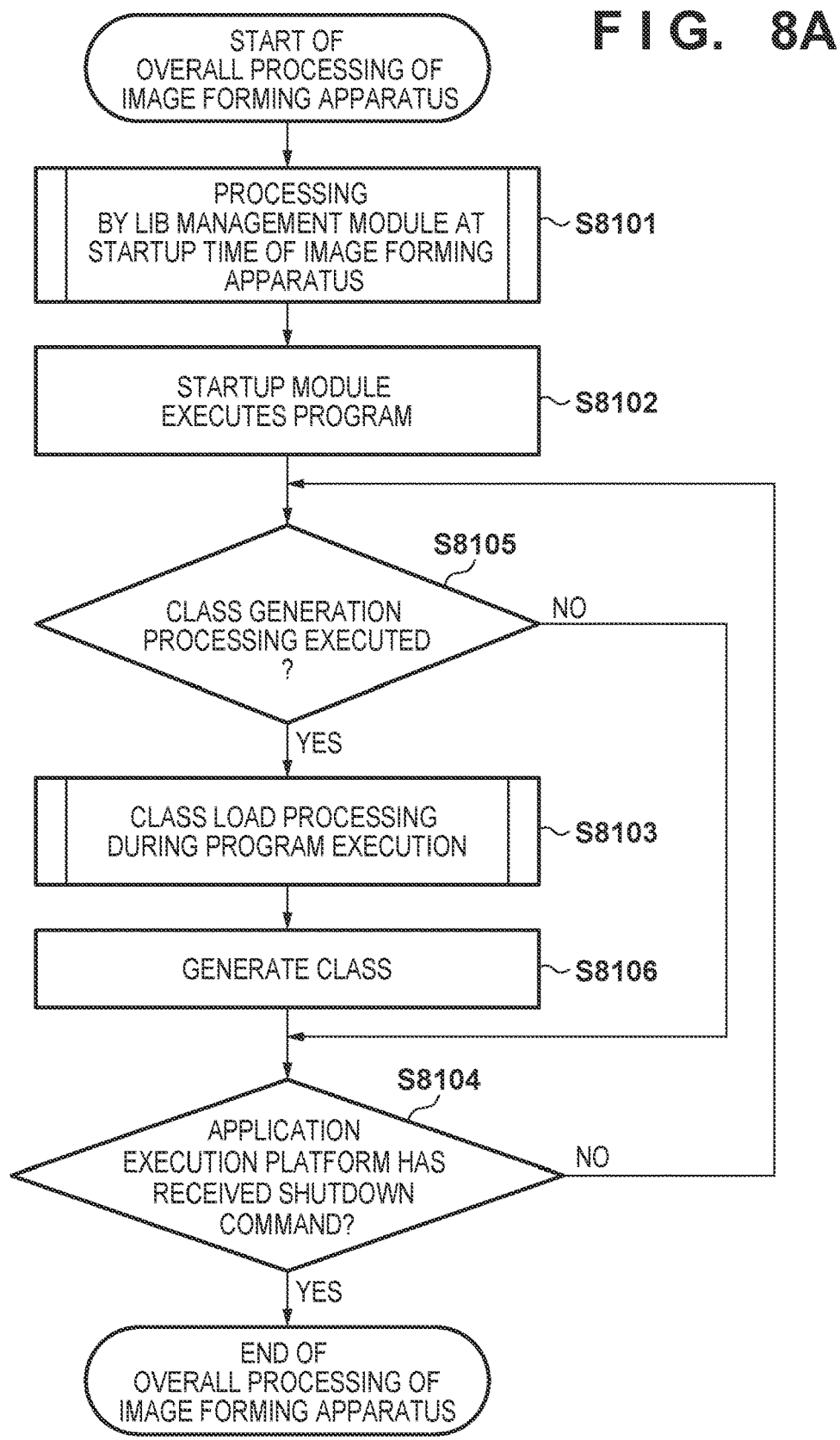
FIGS. 8A, 8B and 8C are flowcharts showing the flow of processing by the image forming apparatus in the first embodiment.

FIG. 8A is a flowchart in the present embodiment schematically representing the flow of processing from when the image forming apparatus 100 is turned on by a user until when power is turned off. The procedure in FIG. 8A is executed by the core unit 200 and, in particular, a processor included in the core unit 200. This procedure is started by the operating system, and respective software modules operates in each step. In the following description, the procedure is described as though the software is the agent thereof, but the software is a virtual agent of the processing, and the actual agent is the processor or processor core that executes the software.

When a user turns on the image forming apparatus 100, the operating system starts operating and first the startup module 300 is started up, and, at step S8101, the startup module 300 commands the Lib management module 304 to perform processing for creating an integrated library. The processing for creating the integrated library by the Lib management module 304 will be described with reference to FIG. 8B. When the Lib management module 304 completes the integrated library creation processing, the startup module 300, at step S8102, starts up the application execution platform 301 with the contents of the startup option configuration file 410 as the startup option. When the application execution platform 301 starts up, the processing of the main program 404 is executed and processing proceeds. The class loader 302, which is a part of the application execution platform 301, monitors the loading of classes. At step S8105, the class loader 302 determines whether the classes have been loaded. At step S8105, when the class loader 302 determines that the application execution platform 301, the app management framework 303 or an application 11n has executed class generation processing during execution of the main program, the processing proceeds to step S8103, and in the case where class generation processing has not been executed, the processing proceeds to step S8104. At step S8103, the class loader 302 performs class load processing. After class load processing ends, the application execution platform 301, the app management framework 303 or the application 11n, at step S8106, generates classes, and the processing proceeds to step S8104. At step S8104, the application execution platform 301 determines whether the image forming apparatus 100 has been turned off by the user after starting up the main program based on a notification from the operating system or the like, for example. If the application execution platform 301 determines that power has been turned off, the application execution platform 301 performs processing for turning off the image forming apparatus 100 and the system of the image forming apparatus 100 ends. If power has not been turned off, the application execution platform 301 continues to execute the main program.

In this way, the application execution platform 301, upon being started up, monitors the class generation and power off in the loop of steps S8105 to S8104. The application execution platform 301 loads the classes when the classes are generated, and performs power off processing when power is turned off.

Processing for Creating an Integrated Library

Figure 8B:
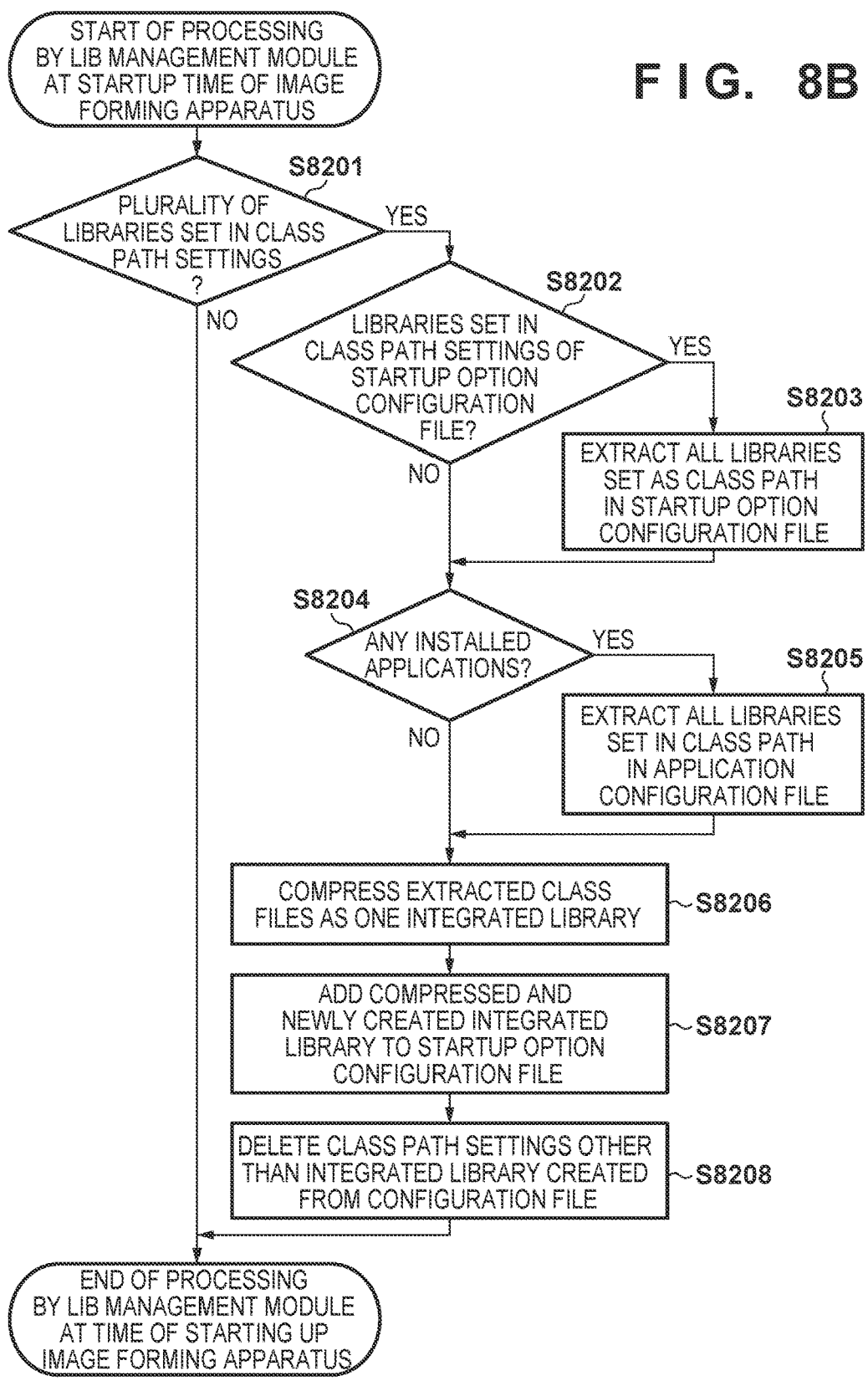

FIG. 8B is a detailed flowchart of step S8101, and schematically represents the flow of processing in the present embodiment by the Lib management module 304 at the time of processing for creating an integrated library being commanded by the startup module 300. At step S8201, the Lib management module 304 determines whether the total number of libraries that are set in the first class path 402 and the second class path 514 is two or more. The Lib management module 304 is able to acquire those contents about these class paths by referring to the startup option configuration file 400 with regard to the first class path and to the app configuration file 502 with regard to the second class path. In the case where the number of libraries that are set is one, the Lib management module 304 ends the processing without performing the processing for creating an integrated library. In the case where a plurality of libraries are set, the processing proceeds to step S8202. At step S8202, the Lib management module 304 reads the startup option configuration file 400 and determines whether a plurality of libraries are set in the first class path 402. If a plurality of libraries are set in the first class path 402, the processing proceeds to step S8203, and if a plurality of libraries are not set, the processing proceeds to step S8204. At step S8203, the Lib management module 304 extracts all of the libraries 403 that are set in the first class path 402. At this time, the Lib management module 304 performs extraction of the libraries in reverse order in which the libraries are described. For example, in the case of the descriptive contents of FIG. 4A, the Lib management module 304 extracts the libraries in order of Libsystem003.jar, Libsystem002.jar and Libsystem001.jar. In this way, in the case where a conflict occurs due to classes with the same name happening by chance to exist in the same name space, it is possible, by extracting the libraries in the reverse order of description, to overwrite the class file extracted earlier with the class file extracted later. Generally, in the case where classes with the same name conflicts in the same name space, the class file whose class path was set earlier is loaded. Accordingly, in the case where a conflict of classes occurs, it is possible, by overwriting with the class file whose description appears earlier, that is, the class file that is extracted later, to keep the class that would originally be expected to be loaded in a typical environment. At step S8204, the Lib management module 304 determines whether there is an application 11n installed in the image forming apparatus 100. If there is no application installed, the processing proceeds to step S8206, and if there is an application installed, the processing proceeds to step S8205. At step S8205, the Lib management module 304 extracts all of the app embedded libraries 501 that are set in the second class path 514. At this time, the Lib management module 304 performs extraction of the libraries in reverse order in which the libraries are described. The reason for this is as described above. When processing for extracting the app embedded libraries 501 ends, the processing proceeds to step S8206. At step S8206, the Lib management module 304 compresses all of the class files extracted at step S8203 and step S8205 into one JAR file as the integrated library 305. The exemplary configuration of the integrated library 305 is as shown in FIG. 7B, and all of the class files before integration shown in FIG. 7A are integrated. At step S8207, the Lib management module 304 then adds the integrated library 305 compressed and created at step S8206 to the settings of the first class path 402. After adding the integrated library, the Lib management module 304, at step S8208, deletes the descriptions of libraries other than the integrated library that is set in the first class path 402. This example is shown in FIG. 4B, and has similar descriptive contents as the startup option configuration file 410. Here, in order to reduce the resources used for storage, after deleting the description other than the integrated library from the settings of the first class path 402, the Lib management module 304 may delete the libraries 601 that remain inside the image forming apparatus 100. The Lib management module 304 ends the processing for creating the integrated library 305 upon changing the descriptive contents of the startup option configuration file.

Class Load Processing

Figure 8C:
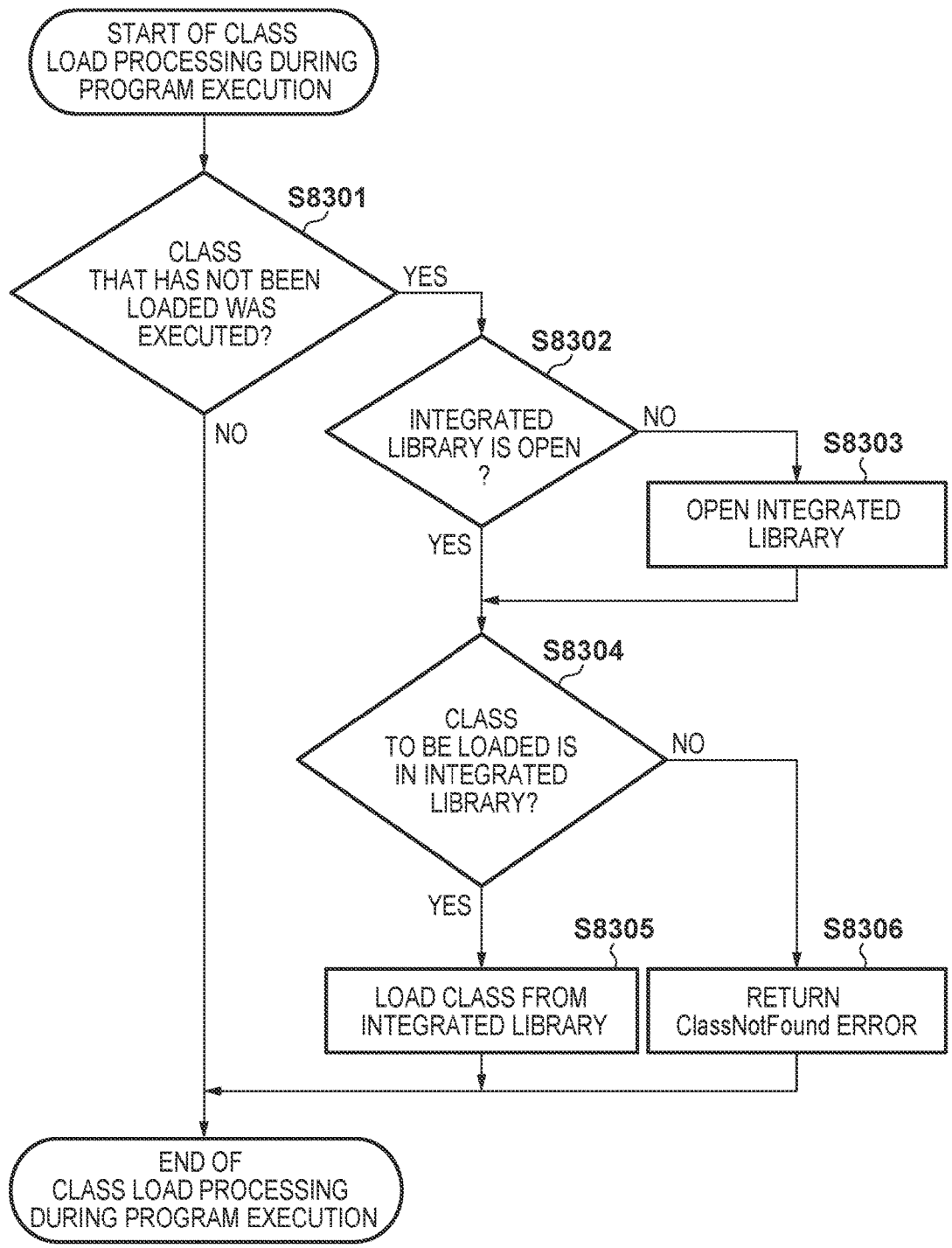

FIG. 8C is a detailed flowchart of step S8103, and schematically represents the flow of processing in the present embodiment by the class loader 302 when classes are generated during execution of the main program.

At step S8301, the class loader 302 determines whether a class that has not been loaded was executed by the main program that is running. If the classes have been loaded, the class load processing ends, and the processing of the main program proceeds. If there is a class that has not been loaded, the processing proceeds to step S8302. At step S8302, the class loader 302 determines whether the integrated library 305 is already open. If it is determined that the integrated library 305 is open, the processing proceeds to step S8304, and if it is determined that the integrated library 305 is not open, the processing proceeds to step S8303. At step S8303, the class loader 302 opens the integrated library 305 that is set in the first class path 411. At this time, resources of an amount that depends on the number of opened libraries is consumed. Specifically, since one file is opened, the class loader 302 consumes only one file descriptor. The processing then proceeds to step S8304. At step S8304, the class loader 302 determines whether there is a class whose loading is desired in the integrated library 305. If the class whose loading is desired is found, the class loader 302, at step S8305, loads the class from the integrated library 305, and ends the class load processing. If the class whose loading is desired to load is not found, the class loader 302, at step S8306, warns the user that the class was not found, through a user interface unit 201 such as a console screen or the screen of a browser. The class load processing is then ended.

As described above, in the first embodiment of the present invention, before starting up the application execution platform 301, the Lib management module 304 creates the integrated library 305, and sets only this integrated library 305 in the first class path 411. As a result, all of the class files are included to the integrated library 305, and thus in the case where the class loader 302 searches for classes after starting up the application execution platform 301, the class loader 302 is able to find the classes by searching within only the integrated library 305. That is, because the class loader 302 opens only one library, the number of file descriptors that are used can also be kept to one. Accordingly, the number of file descriptors that are used in order for the class loader 302 to open libraries can be kept to one, irrespective of the number of libraries that are set in the first class path 402 and the number of libraries that are set in the second class path 514.

Also, once the integrated library 305 is created, the Lib management modules 304, at step S8201, determines that the number of libraries that are set in the class path is one (only the integrated library), when the image forming apparatus 100 is next started up. Thus, the processing for creating the integrated library 305 need be performed only when starting up the image forming apparatus 100 for the first time. Furthermore, even in the case where system updates or installation of applications arise, and the startup option configuration file 410 or the app configuration file 502 are updated, the Lib management module 304 performs integrated library creation processing when the image forming apparatus 100 is next started up. As a result of the configuration file being updated due to updating and installation of applications and system programs, a plurality of libraries may be set in the first class path or the second class path. When there are a plurality of libraries, the Lib management module 304, at step S8201, is able to detect these libraries and remake the integrated library, when the image forming apparatus 100 is next started up. Also, when, for example, the application execution platform 301 monitors installation of new applications and updating of the configuration file, and determines that there has been an update, the processing in FIG. 8B may be executed by the Lib management module 304.

Note that, in the present embodiment, only the integrated library is set in the first class path, but as long as the upper limit of file descriptors that are available in the image forming apparatus 100 is not exceeded, only some of the libraries may be created as the integrated library. For example, the Lib management module 304 extracts only the libraries that are set in the first class path 402, and compresses the extracted class files as an integrated library. The Lib management module 304 then adds the integrated library to the first class path, and deletes description of only the extracted libraries that are set in the first class path. This enables performance to be improved, because the integrated library creation processing of the Lib management module 304 decreases. Thus, in the case where there are a plurality of libraries, the classes included to those libraries are integrated into fewer libraries (one in the present embodiment) than the number of those libraries. As long as the number of libraries after integration is less than the number of libraries before integration, the task of reducing the amount of consumed resources can be resolved.

Second Embodiment

Next, a second embodiment of the present invention will be described using the drawings.

In the first embodiment, all of the classes within the libraries that are set in the first class path 402 and the second class path 514 were compressed as one integrated library 305. Here, when the classes of the libraries that are set in the second class path 514 of a given application 110 are compressed as one integrated library, the classes can be executed from another application (e.g., 111). However, when an application that performs unauthorized operations or a malicious application executes the classes of another application, the operations of the image forming apparatus 100 may become unstable. Note that, generally, class paths are divided into boot class paths, system class paths, app class paths and the like, and the range of classes that can be executed with each class path setting is set. Applications that perform unauthorized operations and malicious applications can thereby be prevented from executing the classes of other applications, but an increase in the number of consumed file descriptors due to an increase in the number of libraries cannot be prevented. In the second embodiment, restriction of accessible classes is balanced with suppression of the number of consumed file descriptors, by integrating classes for each range of classes.

A diagram showing the configuration of the apparatus of the second embodiment of the present invention is similar to that given in FIG. 1. Also, the hardware configuration of the image forming apparatus 100 of the present embodiment is similar to that shown in FIG. 2.

Figure 9:
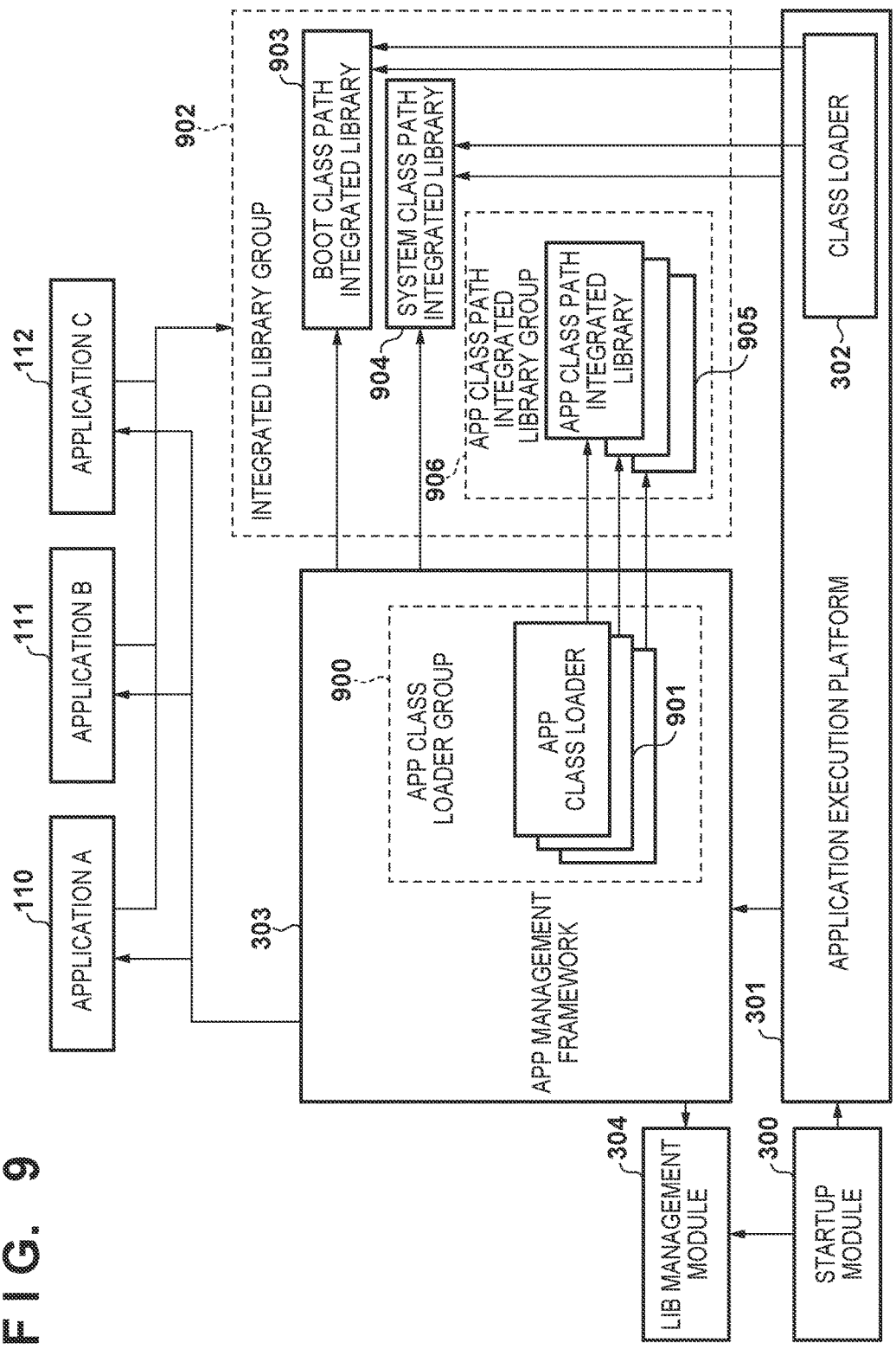
FIG. 9 is a configuration diagram of an application execution environment in the image forming apparatus of a second embodiment.

FIG. 9 shows an application execution environment for executing an application 11n on the image forming apparatus 100 of the present embodiment. An app class loader group 900 is an app class loader group that collects app class loaders 901 that the app management framework 303 generates for each application. The app class loaders 901 are class loaders for loading the classes of the app embedded library 501. The app management framework 303, when starting an application 11n, generates an app class loader 901 for the application 11n that is to be started. Thus, an app class loaders 901 corresponding to each application 11n is generated. In terms of the operations of the various types of class loaders, in the case where a class that has not been loaded was executed, first the class loader 302 searches the libraries that are set on a boot class path 1011 and a system class path 1012 (both are illustrated in FIG. 10B) for the class to be loaded. In the first embodiment, the boot class path and the system class path were collectively called the first class path, but in the subsequent embodiments, the boot class path and the system class path are referred to separately in the description of the embodiments. Also, the app class path was called the second class path in the first embodiment, but in the subsequent embodiments is called the app class path in the description of the embodiments. The class loader 302, in the case where it is able to find the class in the libraries that are set in a boot class path 1011 and a system class path 1012, loads the class from the library. If the class cannot be found, the app class loader group 900 is started up. The app class loader 901 corresponding to the application 11n that is executing processing then searches for the class to be loaded from the libraries that are set in an app class path 1101. If the class can thus be found, the app class loader 901 loads the class. If the app class loader 901 is also not able to find the class, the user is warned, through a user interface unit such as a console screen and the screen of a browser, that the class was not found.

Also, the range of classes that can be executed with the settings of the boot class path 1011, the system class path 1012 and the app class path 1101 for each application 11n are respectively different.

The integrated library group 902 is a library group that collects the integrated libraries that are created by the Lib management module 304. The integrated library group 902 of the present embodiment includes a boot class path integrated library 903, a system class path integrated library 904, and an app class path integrated library group 906. An app class path integrated library 905 that integrates the classes corresponding to each application 11n exists as the libraries of the app class path integrated library group 906, similarly to the app class loaders 901.

This integrated library group 902 is created by the Lib management module 304. The Lib management module 304, upon being commanded to perform integrated library creation processing by the startup module 300, first extracts all of the libraries that are set in a boot class path 1001. The Lib management module 304 then recompresses the extracted and expanded classes in JAR file format as a new boot class path integrated library 903.

The Lib management module 304, after creating the boot class path integrated library 903, changes the settings of the boot class path 1001 in the startup option configuration file 1000 so as to leave only the created newly boot class path integrated library 903.

Next, the Lib management module extracts all of the libraries that are set in a system class path 1002 (discussed later with reference to FIG. 10A).

The Lib management module 304 then recompresses the extracted and expanded classes in JAR file format as a new system class path integrated library 904. Thereafter, the Lib management module 304 changes the settings of the system class path 1002 in the startup option configuration file 1000 so as to leave only the newly created system class path integrated library 904.

Finally, the Lib management module 304 performs app class path integrated library creation processing for every application 11n that is installed. As the app class path integrated library creation processing, first the Lib management module 304 extracts all of the libraries set in the app class path 1101 (discussed later with reference to FIG. 11). The Lib management module 304 then recompresses the extracted and expanded classes in JAR file format as a new app class path integrated library 905. The Lib management module 304, after creating the new app class path integrated library 905, changes the settings of the libraries in the app class path 514 that is in the app configuration file 502 so as to leave only the newly created app class path integrated library 905. When the processing described up to this point has been performed on all of the installed applications 11n, the processing for creating the app class path integrated library by the Lib management module 304 is completed.

In this way, the Lib management module 304 creates integrated libraries with the groups of classes within a plurality of libraries that are set as the boot class path, the system class path and the app class path as respective integrated libraries, and sets the created integrated libraries as respective class paths. By setting the integrated libraries for every type of class path, the range of classes that can be executed can be set according to the range of the respective class paths.

Exemplary Startup Option Configuration File

FIGS. 10A and 10B are diagrams explaining the contents of typical files describing the startup option settings in the present embodiment.

FIG. 10A is a diagram showing a startup option configuration file 1000 before being changed by the Lib management module 304 in the present embodiment. A startup option configuration file 1000 is the descriptive contents before the Lib management module 304 changes the contents of the startup option configuration file. The boot class path 1001 is a boot class path for indicating the location of libraries required in order to start up the Java (registered trademark) execution environment. The system class path 1002 is a system class path for indicating the location of libraries required in order to start up the application execution platform 301 and the app management framework 303.

FIG. 10B is a diagram showing a startup option configuration file 1010 after being changed by the Lib management module 304 in the present embodiment. The startup option configuration file 1010 shows the descriptive contents after the Lib management module 304 has changed the file. In the present embodiment, the startup module 300 reads the contents of the startup option configuration file 1010, and uses the read contents as the startup option of the application execution platform 301. The boot class path 1011 is a class path indicating the location of the boot class path integrated library 903. The Lib management module 304, after creating the boot class path integrated library 903, adds the boot class path integrated library to the class path settings of the startup option configuration file 1000, sets this as a new boot class path 1011, and deletes the libraries other than the integrated library from the boot class path 1001. The system class path 1012 is a class path indicating the location of the system class path integrated library 904. The Lib management module 304, after creation of the system class path integrated library 904, adds the system class path integrated library to an class path setting of the startup option configuration file 1000, sets this as a new system class path 1012, and deletes libraries other than an integrated library from the system class path 1002.

Exemplary App Configuration File

FIG. 11 is a diagram showing an example of items described in the app configuration file 502 after the description of libraries set in the app class path 514 have been deleted by the Lib management module 304. When the startup module 300 commands the Lib management module 304 to perform processing for creating an integrated library, the Lib management module 304 refers to the app class path 514 of the app configuration file 502. The Lib management module 304 then extracts the app embedded library 501 that is set therein and recompresses the extracted classes in JAR file format as the app class path integrated library 905. Thereafter, the Lib management module 304 changes the app class path 514 so as to leave only the newly created app class path integrated library 905, and deletes the descriptions of libraries other than the integrated library set in the app class path 514. An app configuration file 1100 represents the app configuration file after the Lib management module 304 has deleted description of the libraries. The app class path 1101 is the app class path in which the app integrated library 905 is set. Location information 1102 is information on the location of the app executable code file 500 or the app class path integrated library that is set in the app class path.

Exemplary Configuration of Integrated Library Group

Figure 12:
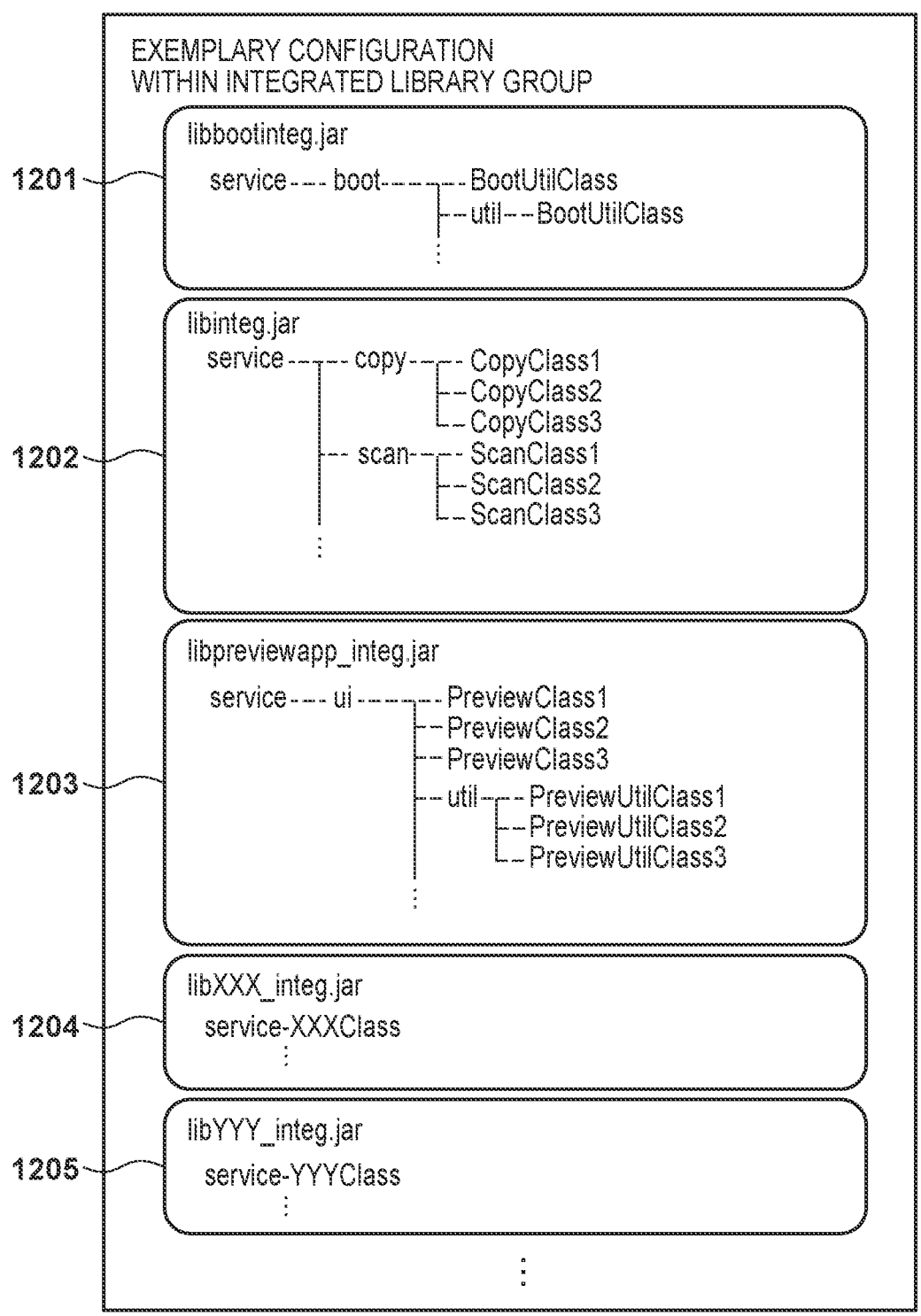
FIG. 12 is a diagram showing an arrangement of class files within an integrated library in the second embodiment.

FIG. 12 is a diagram showing the inside of respective integrated libraries created by compressing the class files for every class path, after the Lib management module 304 has extracted the libraries of the respective class paths. That is, FIG. 12 illustrates the contents of the integrated library group 902. A boot class path integrated library 1201 is an arrangement of the class files within the boot class path integrated library 903 that is set in the boot class path 1011. A system class path integrated library 1202 is an arrangement of the class files within the system class path integrated library 904 that is set in the system class path 1012. Class path integrated libraries 1203 to 1205 are arrangements of class files within the app class path integrated library 905 that is set in the app class path 1101 of each application 11n that is installed.

The class files of the libraries that are set in each class path are all arranged within the integrated libraries. Thus, the class loader 302 and the app class loaders 901 are able to find classes required in execution of processing, simply by searching these integrated libraries for classes.

Integrated Library Generation Processing

FIGS. 13A-1 and 13A-2 show a detailed flowchart of step S8101, and schematically represents the flow of processing, in the present embodiment, of the Lib management module 304 when processing for creating an integrated library is commanded by the startup module 300. Note that the procedure in FIG. 8A is common to the present embodiment and the first embodiment. The flow of processing from when the image forming apparatus 100 is turned on until when power is turned off is similar to the first embodiment.

At step S13101, the Lib management module 304 reads the startup option configuration file 1000, and determines whether a plurality of libraries are set in the boot class path 1001. If a plurality of libraries are set in the boot class path 1001, the processing proceeds to step S13102, and if a plurality of libraries are not set, the processing proceeds to step S13110. At step S13102, the Lib management module 304 extracts all of the libraries that are set in the boot class path 1001. At this time, the Lib management module 304 performs extraction of the libraries in reverse order in which the libraries are described. For example, in the case of the descriptive contents of FIG. 10A, the Lib management module 304 extracts the libraries in order of Libsystem002.jar and Libsystem001.jar. In this way, in the case where a conflict occurs due to classes with the same name happening by chance to exist in the same name space, it is possible, by extracting the libraries in the reverse order of description, to overwrite the class file extracted earlier with the class file extracted later. Generally, in the case where classes with the same name conflicts in the same name space, the class file whose class path was set earlier is loaded. Accordingly, in the case where a conflict of classes occurs, it is possible, by overwriting with the class file whose description appears earlier, that is, the class file that is extracted later, to keep the class that would originally be expected to be loaded in a typical environment. At step S13103, the Lib management module 304 compresses all of the class files extracted at step S13102 into one JAR file as the boot class path integrated library 903. At step S13104, the Lib management module 304 adds the boot class path integrated library compressed and created at step S13103 to the settings of the boot class path 1001. Thereafter, at step S13105, the Lib management module 304 deletes the descriptions of libraries other than the boot class path integrated library that is set in the boot class path 1001 (descriptive contents become similar to the startup option configuration file 1011). Here, in order to reduce the resources used for storage, after step S13105, the Lib management module 304 may delete the libraries set as the boot class path 1001 that remain inside the image forming apparatus 100. When the Lib management module 304 changes the descriptive contents of the startup option configuration file, the processing proceeds to step S13110.

At step S13110, the Lib management module 304 reads the startup option configuration file 1000, and determines whether a plurality of libraries are set in the system class path 1002. If a plurality of libraries are set in the system class path 1002, the processing proceeds to step S13111, and if a plurality of libraries are not set, the processing proceeds to step S13120. At step S13111, the Lib management module 304 extracts all of the libraries that are set in the system class path 1002. At this time, the Lib management module 304 performs extraction of the libraries in reverse order in which the libraries are described. For example, in the case of the descriptive contents of FIG. 10A, the Lib management module 304 extracts the libraries in order of Libsystem004.jar and Libsystem003.jar. In this way, in the case where a conflict occurs due to classes with the same name happening by chance to exist in the same name space, it is possible, by extracting the libraries in the reverse order of description, to overwrite the class file extracted earlier with the class file extracted later. Generally, in the case where classes with the same name conflicts in the same name space, the class file whose class path was set earlier is loaded. Accordingly, in the case where a conflict of classes occurs, it is possible, by overwriting with the class file whose description appears earlier, that is, the class file that is extracted later, to keep the class that would originally be expected to be loaded in a typical environment. At step S13112, the Lib management module 304 compresses all of the class files extracted at step S13111 into one JAR file as the system class path integrated library 904. At step S3113, the Lib management module 304 then adds the system class path integrated library compressed and created to the settings of the system class path 1002. Thereafter, at step S13114, the Lib management module 304 deletes the descriptions of libraries other than the system class path integrated library that is set in the system class path 1002 (descriptive contents become similar to the startup option configuration file 1011). Here, in order to reduce the resources used for storage, after step S13114, the Lib management module 304 may delete the libraries set as the system class path 1002 that remain inside the image forming apparatus 100. When the Lib management module 304 changes the descriptive contents of the startup option configuration file, the processing proceeds to step S13120.

At step S13120, the Lib management module 304 repeats the processing of steps S13121 to S13125 for the number of applications 11n that are installed in the image forming apparatus 100. If an application 11n is not installed, the processing of the Lib management module 304 when commanded to perform processing for creating an integrated library ends.

At step S13121, the Lib management module 304 reads the app configuration file 502 and determines whether a plurality of libraries are set in the app class path 514. If a plurality of libraries are set in the app class path 514, the processing proceeds to step S13122, and if, in the case where a plurality of libraries are not set, there is no other application installed, the Lib management module 304 ends the processing for creating an integrated library.

If there is another application that is installed, the Lib management module performs the processing of steps S13121 to S13125 on that application. At step S13122, the Lib management module 304 extracts (or expands) all of the libraries that are set in the app class path 514. At this time, the Lib management module 304 performs extraction of the libraries in reverse order in which the libraries are described. For example, in the case of the descriptive contents of FIG. 5B, the Lib management module 304 extracts the libraries in order of Libpa005.jar, Libpa004.jar, . . . , and Libpa001.jar. In this way, in the case where a conflict occurs due to classes with the same name happening by chance to exist in the same name space, it is possible, by extracting the libraries in the reverse order of description, to overwrite the class file extracted earlier with the class file extracted later. Generally, in the case where classes with the same name conflicts in the same name space, the class file whose class path was set earlier is loaded. Accordingly, in the case where a conflict of classes occurs, it is possible, by overwriting with the class file whose description appears earlier, that is, the class file that is extracted later, to keep the class that would originally be expected to be loaded in a typical environment. At step S13123, the Lib management module 304 compresses all of the class files extracted at step S13122 into one JAR file as the app class path integrated library 905. At step S13124, the Lib management module 304 adds the app class path integrated library compressed and created at step S13112 to the settings of the app class path 514. Thereafter, at step S13125, the Lib management module 304 deletes the descriptions of libraries other than the app class path integrated library that is set in the app class path 514 (descriptive contents become similar to the app configuration file 1100). Here, in order to reduce the resources used for storage, after step S13114, the Lib management module 304 may delete the libraries set as the app class path 514 that remain inside the image forming apparatus 100. When processing of steps S13121 to S13125 is completed with respect to the applications 11n that are installed in the image forming apparatus 100, the Lib management module 304 ends the processing for creating an integrated library.

Class Load Processing

Figure 13B:
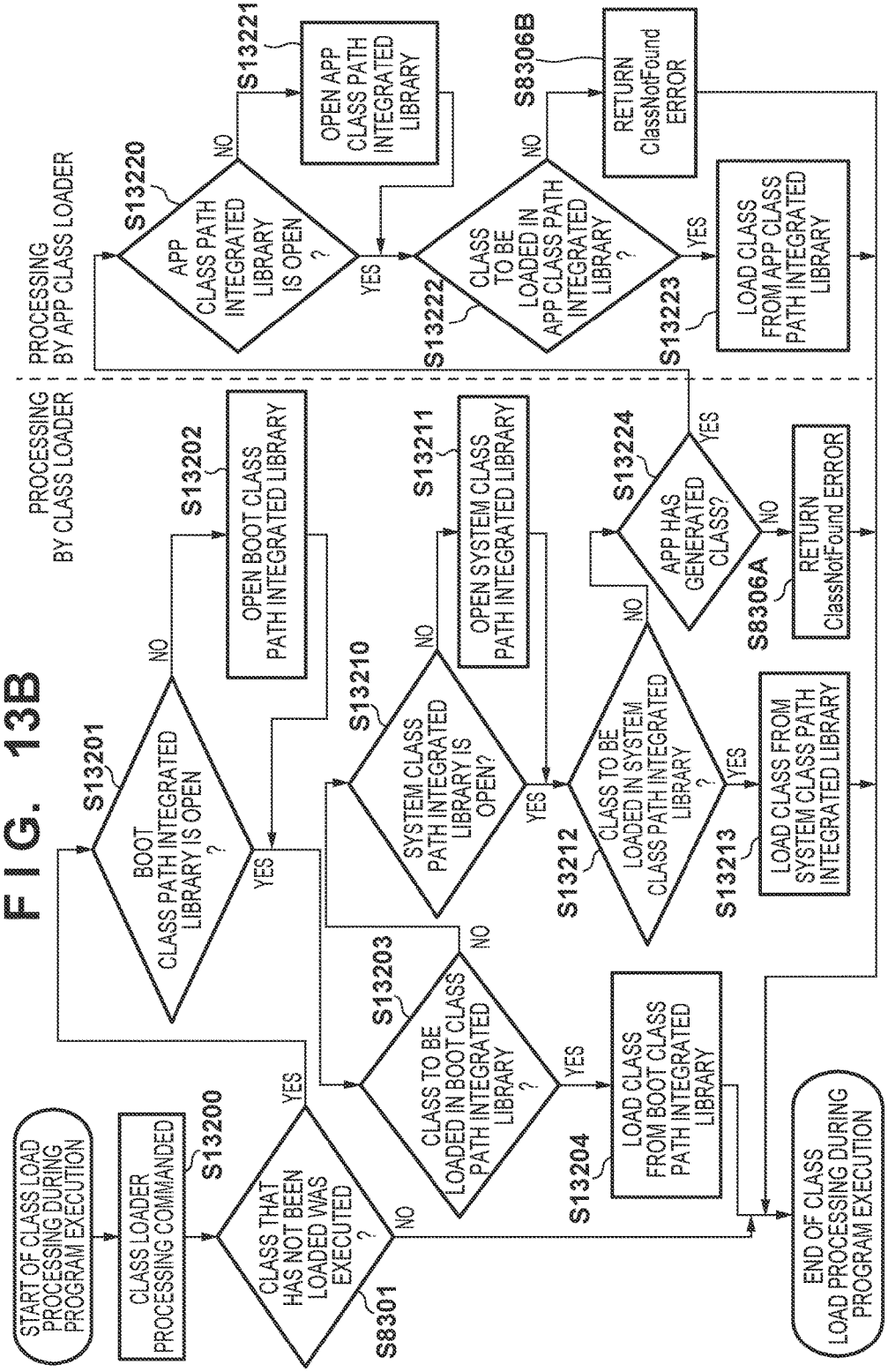

FIG. 13B is a detailed flowchart of step S8103, and schematically represents the flow of processing, in the present embodiment, of the class loader 302 and the app class loaders 901 during execution of the main program.

At step S13200, when the application execution platform 301 and the app management framework 303 or either one thereof executes generation of a class, the application execution platform 301 and the app management framework 303 or either one thereof commands the class loader 302 to perform processing for loading the generated class. When an application executes class generation processing, the app class loader for the app that is going to generate the class, out of the app class loader group 900, commands the class loader 302 to perform processing for loading the generated class. At step S13200, when the class loader 302 is commanded to perform class load processing, the processing proceeds to step S8301. At step S8301, the class loader 302 determines whether a class that has not been loaded was executed by the main program that is running. In the case where it is determined that there is such a class that has not been loaded, the processing proceeds to step S13201. At step S13201, the class loader 302 determines whether the boot class path integrated library 903 is already open. If it is determined that the boot class path integrated library 903 is open, the processing proceeds to step S13203, and if it is determined that the boot class path integrated library 903 is not open, the processing proceeds to step S13202. At step S13202, the class loader 302 opens the boot class path integrated library 903 that is set in the boot class path 1011. The processing then proceeds to step S13203. At step S13203, the class loader 302 determines whether there is a class whose loading is desired in the boot class path integrated library 903. If a class whose loading is desired is found, the class loader 302, at step S13204, loads the class from the boot class path integrated library 903, and ends the class load processing. If a class whose loading is desired is not found, the processing proceeds to step S13210.

At step S13210, the class loader 302 determines whether the system class path integrated library 904 is already open. If it is determined that the system class path integrated library 904 is open, the processing proceeds to step S13212, and if it is determined that the system class path integrated library 904 is not open, the processing proceeds to step S13211. At step S13211, the class loader 302 opens the system class path integrated library 904 that is set in the system class path 1012. The processing then proceeds to step S13212. At step S13212, the class loader 302 determines whether there is a class whose loading is desired in the system class path integrated library 904. If a class whose loading is desired is found, the class loader 302, at step S13213, loads the class from the system class path integrated library 904, and ends the class load processing. If a class whose loading is desired is not found, the processing proceeds to step S13224. At step S13224, the class loader 302 determines whether class load processing has been commanded by an app class loader 901. In the case where the application execution platform 301 or the app management framework 303 executes class generation processing, the application execution platform 301 or the app management framework 303 commands the class loader 302 to perform class load processing. In contrast, in the case where an application 11n executes class generation processing, the app class loader 901 commands the class loader 302 to perform class load processing. The state of the class load processing in step S13224 is a state in which the class loader 302 is unable to find the class to be loaded in the libraries that are set in either the boot class path or the system class path. Thus, in the case where an app class loader 901 commands class load processing, the class loader 302 returns the class load processing to the app class loader 901, and the app class loader 901 performs processing for loading the class from the libraries that are set in the app class path. Here, the class loader 302 returns the processing to the app class loader 901 that commanded the class load processing. The app class loader 901 that commanded the load processing is the app class loader for the application that executed the class generation processing, and thus is able to perform class load processing on the app that executed the class generation processing, among the group of applications. The class load processing by the app class loader 901 is performed at step S13220. In the case where the application execution platform 301 or the app management framework 303 commanded the class loader 302 to perform class load processing, the processing proceeds to step S8306A.

At step S13220, the app class loader 901 determines whether the app class path integrated library 905 for the application 11n that is executing processing is already open. If it is determined that the app class path integrated library 905 is open, the processing proceeds to step S13222, and if it is determined that the app class path integrated library 905 is not open, the processing proceeds to step S13221. At step S13221, the app class loader 901 opens the app class path integrated library 905 that is set in the app class path 1101. The processing then proceeds to step S13222. At step S13222, the app class loader 901 determines whether there is a class whose loading is desired in the app class path integrated library 905. In the case where a class whose loading is desired is found, the app class loader 901, at step S13223, loads the class from the app class path integrated library 905, and ends the class load processing. In the case where the class whose loading is desired is not found, the processing proceeds to step S8306B. The class load processing ends when the processing of step S8306 or step S13223 is completed.

The above procedure can be summarized as follows. When class generation processing is executed during execution of a program, a class loader perform the class load processing. If the class to be generated has not been loaded, the class loader 302 searches the boot class path integrated library 903 set as the boot class path for the class to be loaded. If the class can be found in the boot class path integrated library 903 that is set in the boot class path, the class loader 302 loads the class from the boot class path integrated library 903. If the class cannot be found in the boot class path integrated library 903, the class loader 302 searches the system class path integrated library 904 for the class to be loaded. If the class can be found in the system class path integrated library 904, the class loader 302 performs loading of the class from the system class path integrated library 904 shown with the system class path. In the case where the class cannot be found in the system class path integrated library 904, the class loader 302 stops the class load processing, and determines whether the program that is running is a system or an application. If the program that is running is the application execution platform 301 or a system such as the app management framework 303, the class loader 302 gives the user an error warning that the class was not found. If the program that is running is an app, the app class loader 901 of the app that is running performs class load processing. Note that if the application execution platform 301 or the app management framework 303 is executed following execution of an application, it is assumed that the program that is running is determined to be an app. In the case where an app executes class generation processing, the app class loader group 900 commands the class loader 302 to perform class load processing. As a result of the class loader 302 returning the processing to the app class loader 901 that commanded the class load processing when the class cannot be found, the app class loader 901 for the app during program execution is able to start the class load processing. For example, when the app class loader for an application A 110 is given as an app class loader A, the app class loader A commands the class loader 302 to perform class load processing, in the case where the program that is running is the application A 110. In the case where the class loader 302 is not able to find the class to be loaded in either the boot class path integrated library 903 or the system class path integrated library 904, the class loader 302 returns the processing to the app class loader A. Since the processing is returned to the app class loader A, class load processing can be executed from the app class path integrated library that is set in the app class path of the application A 110 that is running from among a plurality of applications. When the app class loader starts the load processing, the app class loader searches the app class path integrated library 905 for the class to be loaded. In the case where the class to be loaded can be found in the app class path integrated library 905, the app class loader A loads the class. In the case where the class to be loaded cannot be found in the app class path integrated library 905, the class loader 302 gives the user an error warning that the class was not found. In the case where the class loader 302 or the app class loader A loads a class, or a warning is issued due the class to be loaded not being found, the class load processing ends.

As described above, in the second embodiment of the present invention, before starting up the application execution platform 301, the Lib management module 304 integrates the libraries for each class path to create an integrated library, and sets only the integrated library in each class path. As a result, all of the class files of the libraries that are set in each class path are included in the integrated library, and thus in the case where the class loader 302 searches for a class, the class loader 302 is able to find the class simply by searching each integrated library. Because the integrated libraries are set for every type of class path, the range of classes that can be executed can be matched with the range of each class path. Accordingly, the number of file descriptors consumed by the class loader can be reduced to the number of types of class paths, irrespective of the number of libraries that are set in each class path. Also, applications that perform unauthorized operations and malicious applications can be prevented from executing the classes of other applications.

Note that, in the present embodiment, a configuration was adopted in which integrated libraries for a boot class path, a system class path and an app class path are created and set in the class paths. However, as long as the upper limit of file descriptors available in the image forming apparatus 100 is not exceeded, integrated libraries may be created and set for only some of the types of class paths. For example, the Lib management module may create integrated libraries for only the boot class path and the system class path, and set the created integrated libraries in these class paths. This enables performance to be improved, because the integrated library creation processing by the Lib management module 304 decreases.

Third Embodiment

Next, a third embodiment of the present invention will be described using the drawings.

In the first embodiment and the second embodiment, the Lib management module 304 creates an integrated library at the time of starting up the image forming apparatus 100, and sets the integrated library in a class path. At the time of starting up the image forming apparatus 100, the Lib management module 304 determines whether there are a plurality of libraries set in the app class path, thus enabling integrated library creation processing to be executed even when an application 11$n$ is newly installed. However, after installing the application 11$n$ in the image forming apparatus 100, a user administrator may start the application 11$n$, without restarting the image forming apparatus 100. In that case, the class loader consumes the file descriptors for several libraries of the newly installed application 11$n$, until the image forming apparatus 100 is restarted. The present embodiment describes a system that, by also performing processing for integrating libraries at the time of installing an application, is able to integrate class libraries even without restarting the image forming apparatus.

A diagram showing the configuration of the apparatus of the third embodiment of the present invention is similar to FIG. 1. Also, the hardware configuration of the image forming apparatus 100 in the present embodiment is similar to FIG. 2. A configuration diagram of the application execution environment for executing an application 11$n$ on the image forming apparatus 100 in the present embodiment is similar to FIG. 9. The configurations of the startup option configuration file and the app configuration file are respectively similar to FIG. 10B and FIG. 11. Also, the processing procedure from startup of the image forming apparatus 100 to power OFF is as shown in FIG. 14A.

Processing by the Image Forming Apparatus 100

Figure 14A:
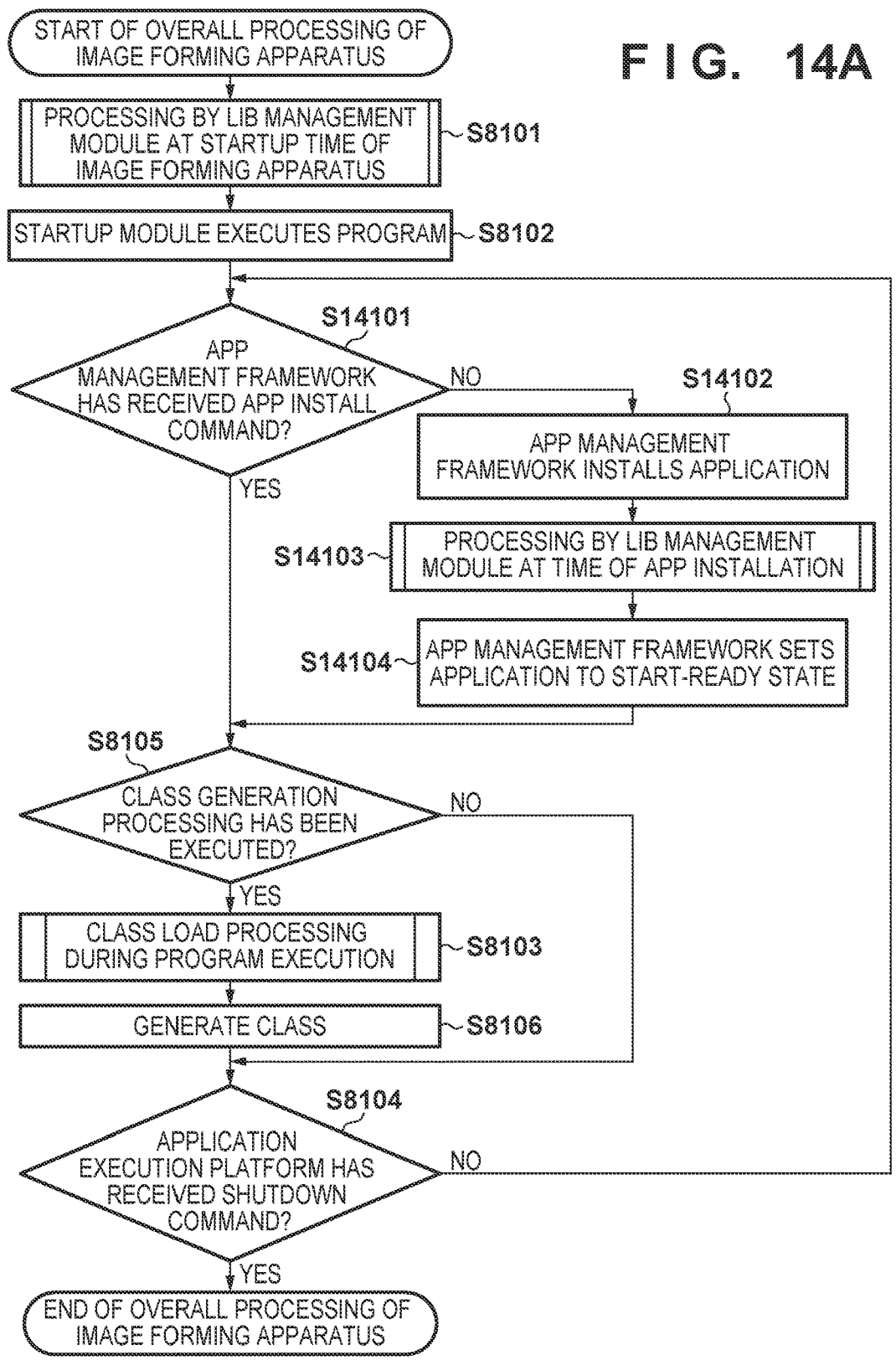
FIGS. 14A and 14B are flowcharts showing the flow of processing by the image forming apparatus in a third embodiment.

FIG. 14A is a flowchart schematically representing the flow of processing from when the image forming apparatus 100 of the present embodiment is turned on until when power is turned off. Note that although the individual steps are different from FIG. 8, the execution agent and the like are similar to FIG. 8. Step S8101 and step S8102 are similar to the processing shown in FIG. 8A. The details of step S8101 are as shown in the procedure of FIGS. 13A-1 and 13A-2. At step S14101, the app management framework 303 determines whether a request for an application 11$n$ was received during execution of the main program. When the user administrator sends a request so as to perform installation of an application 11$n$ in the image forming apparatus 100, the app management framework 303 receive that request. If a request for installation of an application 11n has been received, the processing proceeds to step S14102, and if such a request has not been received, the processing proceeds to step S8103. Step S8103 and step S8104 are similar to the processing shown in FIG. 8A. The details of step S8103 are as shown in the procedure of FIG. 13B. At step S14102, the app management framework 303 installs the application 11n designated by the user at step S14101 in the image forming apparatus 100. When processing for installing the application 11n is completed, the processing proceeds to step S14103. At step S14103, the app management framework 303 commands the Lib management module 304 to perform processing for creating the app class path integrated library 905 for the application 11n that is installed. When the Lib management module 304 completes the processing for creating the app class path integrated library 905, the processing proceeds to step S14104. At step S14104, the app management framework 303 sets the installed application 11n to a start-ready state. When the application 11n enters the start-ready state, the user administrator is able to send a request to start the installed application 11n to the image forming apparatus 100. After the application 11n has entered the start-ready state, the processing proceeds to step S8103.

Integrated Library Creation Processing

Figure 14B:
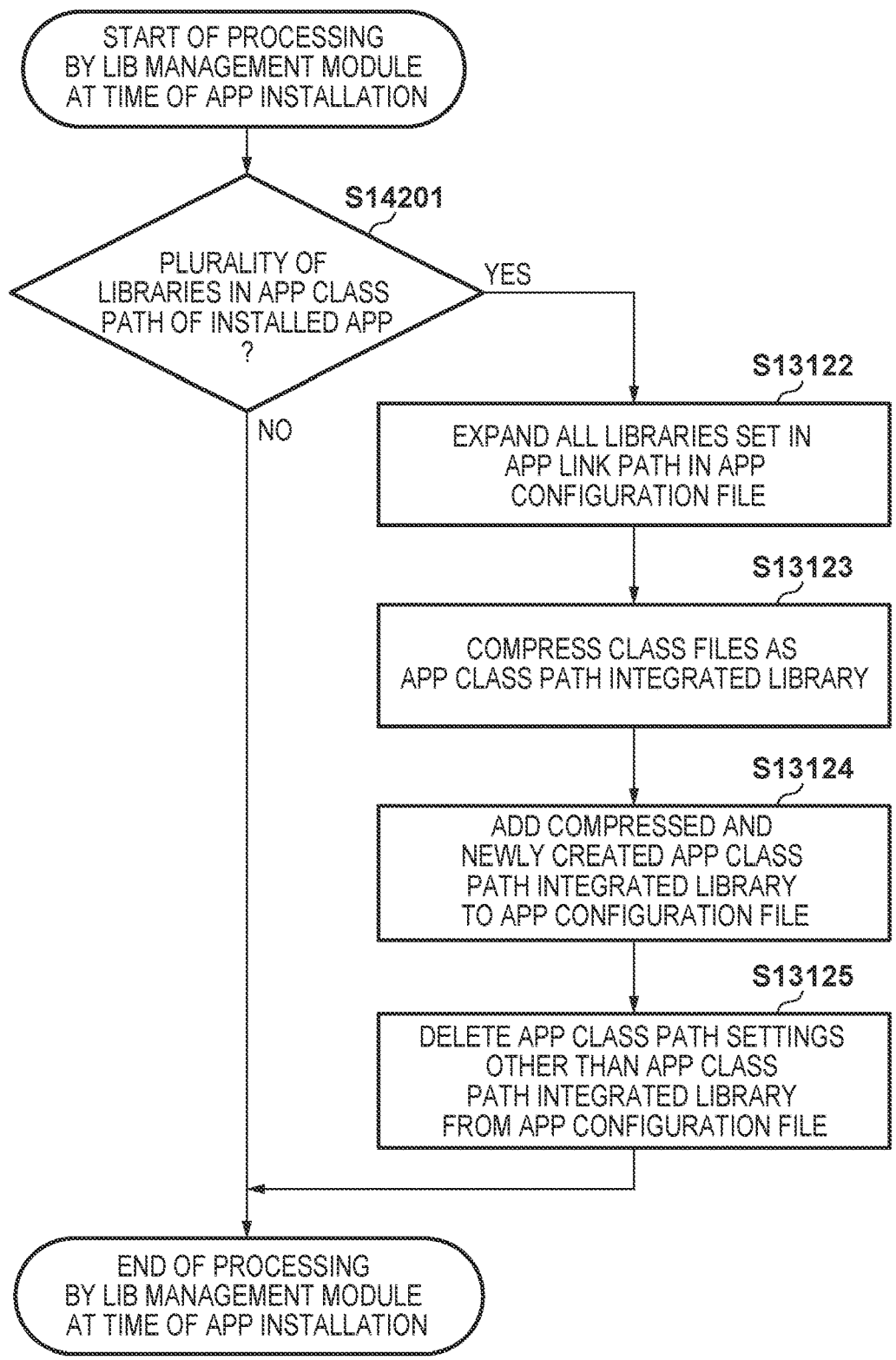

FIG. 14B is a detailed flowchart of step S14103, and schematically represents the flow of processing, in the present embodiment, of the Lib management module when processing for creating an app class path integrated library is commanded by the app management framework.

At step S14201, the Lib management module 304 reads the app configuration file 502 of the application 11n to be installed, and determines whether a plurality of libraries are set in the app class path 514. If a plurality of libraries are set in the app class path 514, the processing proceeds to step S13122, and if a plurality of libraries are not set, the Lib management module 304 ends the processing for creating the app class path integrated library 905 at the time of app installation. Steps S13122 to S13125 are similar to the processing shown in FIG. 13B.

The flow of processing at the time of class loading by the class loader 302 and the app class loaders 901 in the present embodiment is similar to FIGS. 13A-1 and 13A-2.

As described above, in the third embodiment of the present invention, after installing the application 11n, the Lib management module 304 creates the app class path integrated library 905 and set the created app class path integrated library 905 in the app class path 1101. After the app class path integrated library creation processing, the app management framework 303 sets the installed application 11n to a start-ready state. As a result, the app class loader 901 is able to use the app class path integrated library 905, even when the application 11n installed by the user administrator is started, before restarting the image forming apparatus 100. That is, the number of file descriptors consumed by the app class loader 901 for an installed application can be reduced to one, irrespective of the number of libraries that are set in the class path of the installed application 11n.

Other Embodiments

The third embodiment is based on the second embodiment, but may be based on the first embodiment. In that case, the details of step S8101 in FIG. 14A will be as shown in FIG. 8B, and the details of step S8103 will be as shown in FIG. 8C. Also, steps S13122 to S13125 in FIG. 14B may be replaced by steps S8205 to S8208 in FIG. 8B.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-006558, filed Jan. 15, 2016, which is hereby incorporated by reference herein in its entirety.

What is claimed is:

1. An information processing apparatus that consumes resources of an amount that depends on how many libraries are open, comprising:
    a determining unit, configured to determine whether the number of libraries including classes set for an installed program is two or more; and
    an integrating unit, configured to integrate, in a case where it is determined that the number of libraries is two or more, the classes included to the libraries into libraries of smaller number than the number of libraries, wherein
    the determining unit specifies, with reference to a class path indicating class locations that is described in a configuration file of the installed program, a library including a class that is set for the program,
    the program includes a system program and an application, with a boot class path and a system class path being described in the configuration file with regard to the system program and an application class path being described in the configuration file with regard to the application, and
    the integrating unit integrates the classes included to the library based on the class paths.

2. The information processing apparatus according to claim 1, wherein
    the integrating unit integrates the classes, when the information processing apparatus is started up.

3. The information processing apparatus according to claim 1, wherein
the integrating unit integrates the classes, when an application is installed as the program.

4. The information processing apparatus according to claim 1, further comprising:
a loading unit, configured, when executing the program, to open a library including a class that is set for the program and loading the class.

5. The information processing apparatus according to claim 1, wherein
the integrating unit integrates the classes included to the libraries into one library.

6. The information processing apparatus according to claim 1, wherein
the integrating unit integrates the classes by generating a library that includes the classes to be integrated.

7. The information processing apparatus according to claim 1, wherein
the integrating unit integrates the classes such that a relative configuration of the classes that exists in the libraries before integration is maintained after integration of the libraries.

8. The information processing apparatus according to claim 1, wherein
the resources include a file descriptor.

9. The apparatus according to claim 1, wherein
the integrating unit integrates the libraries for at least one class path of class paths including a boot class path, a system class path and an application class path.

10. A method of controlling an information processing apparatus that consumes resources of an amount that depends on how many libraries are open, the method comprising:
determining whether the number of libraries including classes set for an installed program is two or more; and
integrating, in a case where it is determined that the number of libraries is two or more, the classes included to the libraries into libraries of smaller number than the number of libraries, wherein
the determining specifies, with reference to a class path indicating class locations that is described in a configuration file of the installed program, a library including a class that is set for the program,
the program includes a system program and an application, with a boot class path and a system class path being described in the configuration file with regard to the system program and an application class path being described in the configuration file with regard to the application, and
the integrating integrates the classes included to the library based on the class paths.

11. The method according to claim 10, wherein
the integrating integrates the libraries for at least one class path of class paths including a boot class path, a system class path and an application class path.

12. A non-transitory computer-readable medium storing a program for causing, when executed by a computer, a method of controlling an information processing apparatus that consumes resources of an amount that depends on how many libraries are open, the method comprising:
determining whether the number of libraries including classes set for an installed program is two or more; and
integrating, in a case where it is determined that the number of libraries is two or more, the classes included to the libraries into libraries of smaller number than the number of libraries, wherein
the determining specifies, with reference to a class path indicating class locations that is described in a configuration file of the installed program, a library including a class that is set for the program,
the program includes a system program and an application, with a boot class path and a system class path being described in the configuration file with regard to the system program and an application class path being described in the configuration file with regard to the application, and
the integrating integrates the classes included to the library based on the class paths.

* * * * *